United States Patent
Kim et al.

(10) Patent No.: US 8,277,963 B2
(45) Date of Patent: Oct. 2, 2012

(54) BATTERY PACK

(75) Inventors: Bongyoung Kim, Yongin-si (KR); Kisung Hong, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 711 days.

(21) Appl. No.: 12/382,857

(22) Filed: Mar. 25, 2009

(65) Prior Publication Data

US 2009/0263711 A1 Oct. 22, 2009

(30) Foreign Application Priority Data

Apr. 18, 2008 (KR) .................. 10-2008-0036341

(51) Int. Cl.
- *H01M 14/00* (2006.01)
- *H01M 2/02* (2006.01)
- *H01M 2/08* (2006.01)

(52) U.S. Cl. ............. 429/7; 429/178; 429/181; 429/183
(58) Field of Classification Search ............. 429/82, 429/170, 178, 7, 181, 183
See application file for complete search history.

(56) References Cited

U.S. PATENT DOCUMENTS

| 7,326,479 | B2 * | 2/2008 | Nishimura et al. | 429/7 |
| 7,615,309 | B2 * | 11/2009 | Kim et al. | 429/158 |
| 2007/0160878 | A1 | 7/2007 | Kim et al. | |
| 2009/0317715 | A1 | 12/2009 | Jung et al. | |

FOREIGN PATENT DOCUMENTS

| JP | 2002-231192 A | 8/2002 |
| JP | 2006-004783 A | 1/2006 |
| JP | 2006-147193 A | 6/2006 |
| KR | 10 2007-0066407 A | 6/2007 |
| KR | 10 2008-0036252 A | 4/2008 |

OTHER PUBLICATIONS

JP 2006-147193 Machine translation, Jun. 2006.*

* cited by examiner

*Primary Examiner* — Patrick Ryan
*Assistant Examiner* — Julian Anthony
(74) *Attorney, Agent, or Firm* — Lee & Morse, P.C.

(57) ABSTRACT

A battery pack, including a cell including a cathode, an anode, and an electrode terminal having a bolt coupling region on a surface thereof, a circuit board electrically coupled to the cell and having a bolt through-hole at a position corresponding to the bolt coupling region, and a bolt passing through the bolt through-hole and coupled to the bolt coupling region.

18 Claims, 26 Drawing Sheets

BATTERY PACK

BACKGROUND

1. Technical Field

Embodiments relate to a battery pack.

2. Description of the Related Art

A rechargeable battery may be formed by electrically connecting a cell, formed by sealing a can accommodating an electrode assembly and electrolyte, and a circuit board. The cell may charge/discharge electricity using a chemical reaction. The circuit board may control the charge/discharge of the cell and prevent overcharge/overdischarge of the cell, to protect the cell.

When the cell and the circuit board are connected to form the rechargeable battery, electrical resistance therebetween may be reduced in order to improve charge/discharge efficiency. If the electrical resistance between the cell and the circuit board increases, the charge/discharge efficiency of the cell may be reduced.

The rechargeable battery may be mounted in an electronic device after being formed in a pack by integrally connecting a cell, a circuit board, and a cover for surrounding the circuit board. However, the electrical resistance between the cell and the circuit board may increase due to an external force. For example, the electrical resistance may increase as contact resistance increases where the cell and the circuit board are connected.

When the battery pack is mounted in a battery receiving space of the electronic device, it is desirable for the battery pack to have a small volume corresponding to the battery receiving space.

In addition, the battery pack should have an electrical resistance as low as possible for improving charging/discharging efficiency. The electrical wires between the cell and circuit board may cause heat in the cell when the conductivity is low. Accordingly, the lifetime of the cell may be shortened. Particularly, when the battery pack is used for a long time, the internal resistance may be gradually increased. Thus, the lifetime of the cell may be increased according to a decrease of the resistance value of the wire that electrically couples the cell to the circuit board.

In addition, a battery pack may be designed to be detachable from the portable electronic device. The battery pack may be manufactured by mass-production, and thus the assembly of the battery should be simplified by reducing the number of manufacturing steps, thereby reducing manufacturing time.

SUMMARY

Embodiments are therefore directed to a battery pack, which substantially overcomes one or more of the problems due to the limitations and disadvantages of the prior art.

It is therefore a feature of an embodiment to provide a battery pack that can improve efficiency by simplifying assembly of a cell and circuit board.

It is therefore another feature of an embodiment to provide a battery pack that can prevent an increase of internal resistance between the cell and circuit board after extended use or external impact.

It is therefore another feature of an embodiment to provide a battery pack that can be minimized to reduce installation space thereof in portable electronic devices.

At least one of the above feature and advantages may be realized by providing a battery pack, including a cell including a cathode, an anode, and an electrode terminal having a bolt coupling region on a surface thereof, a circuit board electrically coupled to the cell, and having a bolt through-hole at a position corresponding to the bolt coupling region, and a bolt passing through the bolt through-hole and coupled to the bolt coupling region.

The cell may include an electrode assembly, a can having an opening at one end for the electrode assembly, and a cap assembly including the electrode terminal, a cap plate having an electrode terminal hole corresponding to the electrode terminal, and sealing the opening of the can, an insulating gasket between the electrode terminal and the cap plate, a terminal plate having a terminal plate hole corresponding to the electrode terminal, and an insulating plate between the terminal plate and the cap plate.

The circuit board may include an insulating substrate, a printed circuit pattern electrically coupled to the cell, and formed integrally with the insulating substrate, a protection circuit unit on the insulating substrate, and electrically coupled to the printed circuit pattern, and a charging/discharging terminal electrically coupled to the printed circuit pattern and protection circuit unit.

The electrode terminal may be electrically coupled to the cathode or anode of the cell, and the electrode terminal may be electrically coupled to the circuit board by the bolt.

The bolt may include a bolt head having a screw driver coupling groove, and a bolt body connected to the bolt head, the bolt body having a diameter smaller than that of the bolt head, and threads formed on an outer circumference surface thereof, the circuit board may include a bolt head seating groove having a diameter larger than that of the bolt through-hole at an upper part of the bolt through-hole, and the bolt head may be seated in the bolt head seating groove.

The battery pack may further include a conducting pad between the circuit board and electrode terminal, wherein the conducting pad electrically couples the circuit board to the electrode terminal.

The conducting pad may include a conducting pad hole, and the bolt may pass through the conducting pad hole and is coupled to the bolt coupling region.

The circuit board may include a conducting pad insertion groove at a lower part thereof, and the conducting pad is connected to the electrode terminal and is in the conducting pad insertion groove.

The battery pack may further include a conducting member electrically coupling the cell to the circuit board, wherein the conducting member is electrically coupled to the anode of the cell when a polarity of the electrode terminal is positive, and is electrically coupled to the cathode of the cell when a polarity of the electrode terminal is negative.

The conducting member may include a conducting member head having a screw driver coupling groove, a conducting member body, connected to the conducting member head, having a diameter smaller than that of the conducting member head, and having threads on a portion thereof, and a conducting member projection, spaced from the conducting member head, and projecting from a circumference surface of the conducting member body, the cell may include a side part coupling groove on the surface of the cell including the electrode terminal, and the threads of the conducting member are coupled to the side part coupling groove, the circuit board may include a conducting member insertion groove at a peripheral part of the circuit board, and a lower part of the conducting member head may be seated on an upper surface of the conducting member insertion groove, and an upper surface of the conducting member projection contacts a lower surface of the conducting member insertion groove.

The conducting member may include a first region electrically coupled to the circuit board, a second region bent substantially perpendicularly to the first region, and a third region electrically coupled to the cell, bent substantially perpendicularly to the second region, and bent away from the first region.

The conducting member may be electrically coupled to the circuit board, and includes a laser welding part at a position where the conducting member contacts the cell.

The battery pack may further include a conducting member bolt connecting the conducting member to the cell, wherein the conducting member includes a conducting member bolt through-hole on a surface thereof, and the cell includes a side part coupling groove on the surface including the electrode terminal, the conducting member bolt passes through the conducting member bolt through-hole, and is coupled to the side part coupling groove.

The conducting member may include a first region electrically coupled to the circuit board, a second region, bent substantially perpendicular to the first region, and extending along a side surface of the cell, and a third region, bent substantially perpendicular to the second region, connected to a lower surface of the cell, and bent towards the first region.

The cell may include an electrode assembly, a cylindrical can having an opening for the electrode assembly, and a cap assembly including the electrode terminal, a PTC element under the electrode terminal, a safety vent under the PTC element, and an insulating gasket insulating the electrode terminal, PTC element, and a side part of the safety vent, and sealing the opening of the can.

The battery pack may further include an insulator between the circuit board and the cell.

The battery pack may further include a cover surrounding the circuit board, wherein the cover includes a charging/discharging terminal hole on a surface thereof.

The cover may include a cover hole, the bolt passing through the cover hole and bolt through-hole, and coupled to the bolt coupling region.

The cover may include a cover groove having a diameter larger than that of the cover hole, and the bolt may include a bolt head and a bolt body connected to the bolt head, the bolt body having threads and a diameter smaller than that of the bolt head, and the lower surface of the bolt head is seated in the cover groove.

The battery pack may further include an outer case surrounding the cover and the cell.

BRIEF DESCRIPTION OF THE DRAWINGS

The above and other features and advantages will become more apparent to those of ordinary skill in the art by describing in detail exemplary embodiments thereof with reference to the attached drawings, in which:

FIG. 1c illustrates a perspective view of an assembled battery pack shown in FIG. 1a;

FIG. 1d illustrates an exploded perspective view of a cell shown in FIG. 1a

FIG. 1e illustrates a perspective view of the underside of the circuit board shown in FIG. 1a;

FIG. 2b illustrates a perspective view of an assembled battery pack shown in FIG. 2a;

FIG. 3b illustrates a perspective view of an assembled battery pack shown in FIG. 3a;

FIG. 4b illustrates a perspective view of an assembled battery pack shown in FIG. 4a;

FIG. 5b illustrates an exploded perspective view of a partially assembled battery pack shown in FIG. 5a;

FIG. 5c illustrates a perspective view of an assembled battery pack shown in FIG. 5a;

FIG. 5d illustrates an exploded perspective view of a cell shown in FIG. 5a

FIG. 6b illustrates a perspective view of an assembled battery pack shown in FIG. 6a;

DETAILED DESCRIPTION

Figure 1A:
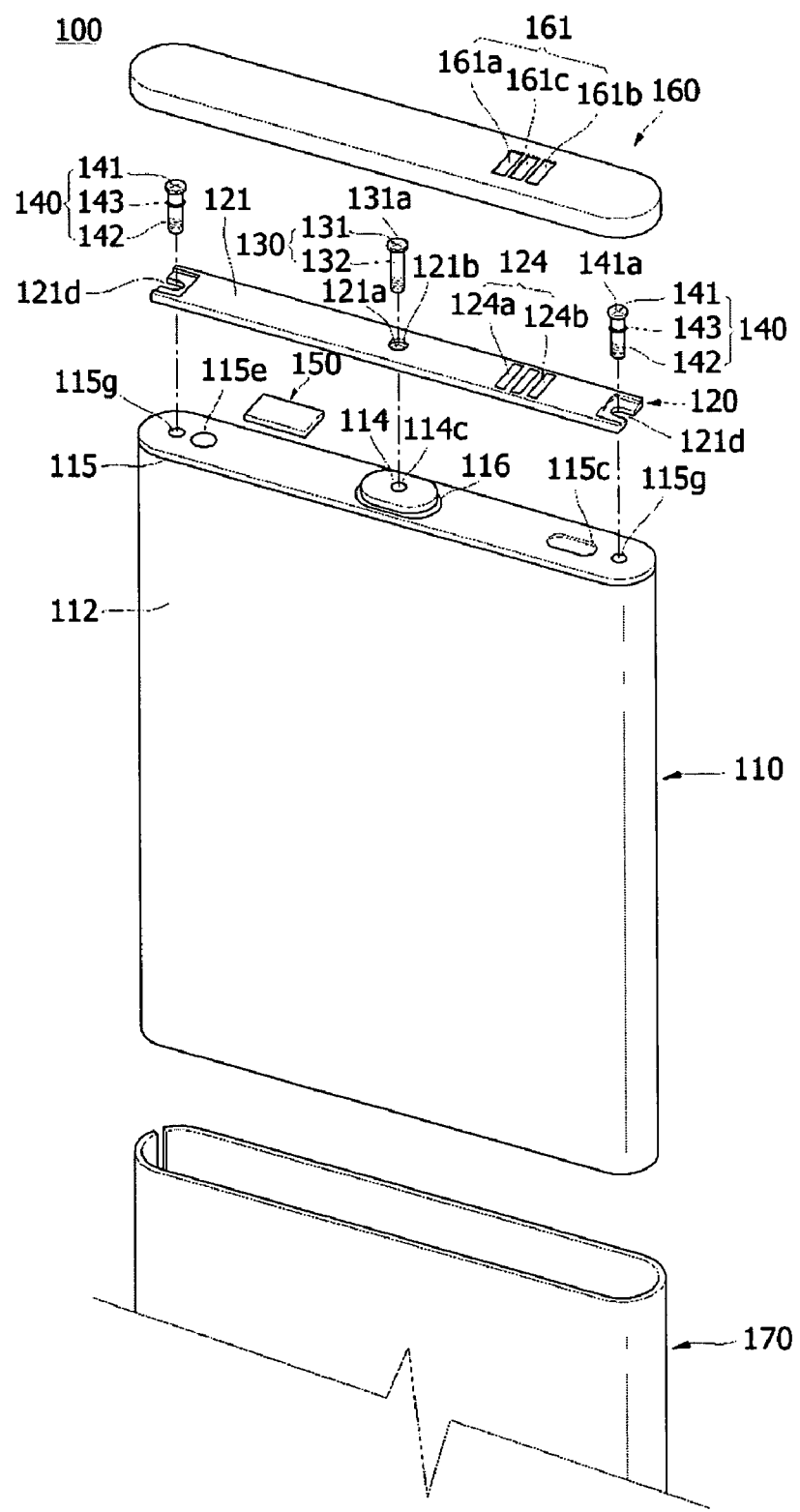
FIG. 1a illustrates an exploded perspective view of a battery pack according to an embodiment.
Figure 1B:
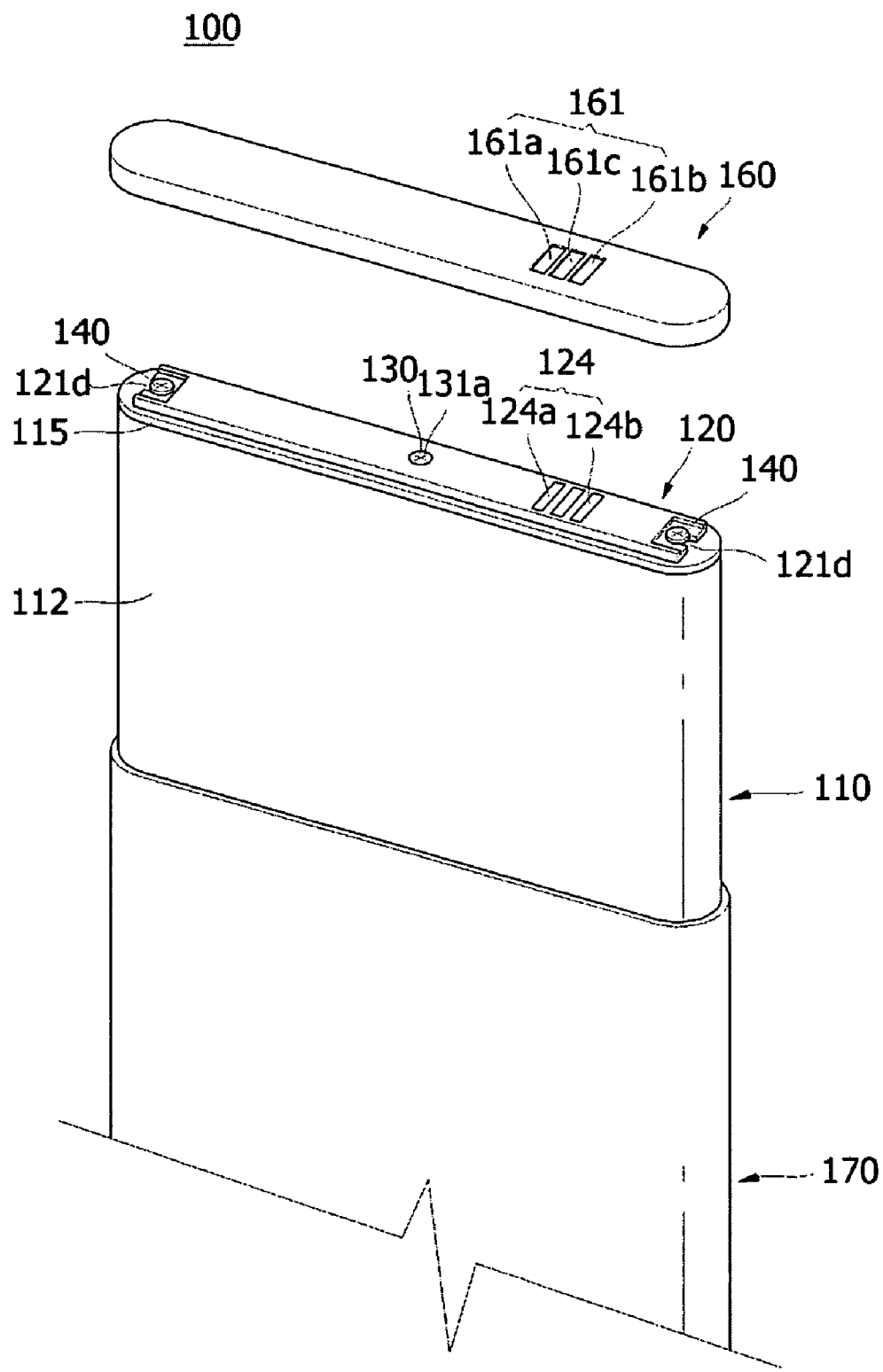
FIG. 1b illustrates an exploded perspective view of the circuit board shown in FIG. 1a coupled to a cell by a bolt.
Figure 1C:
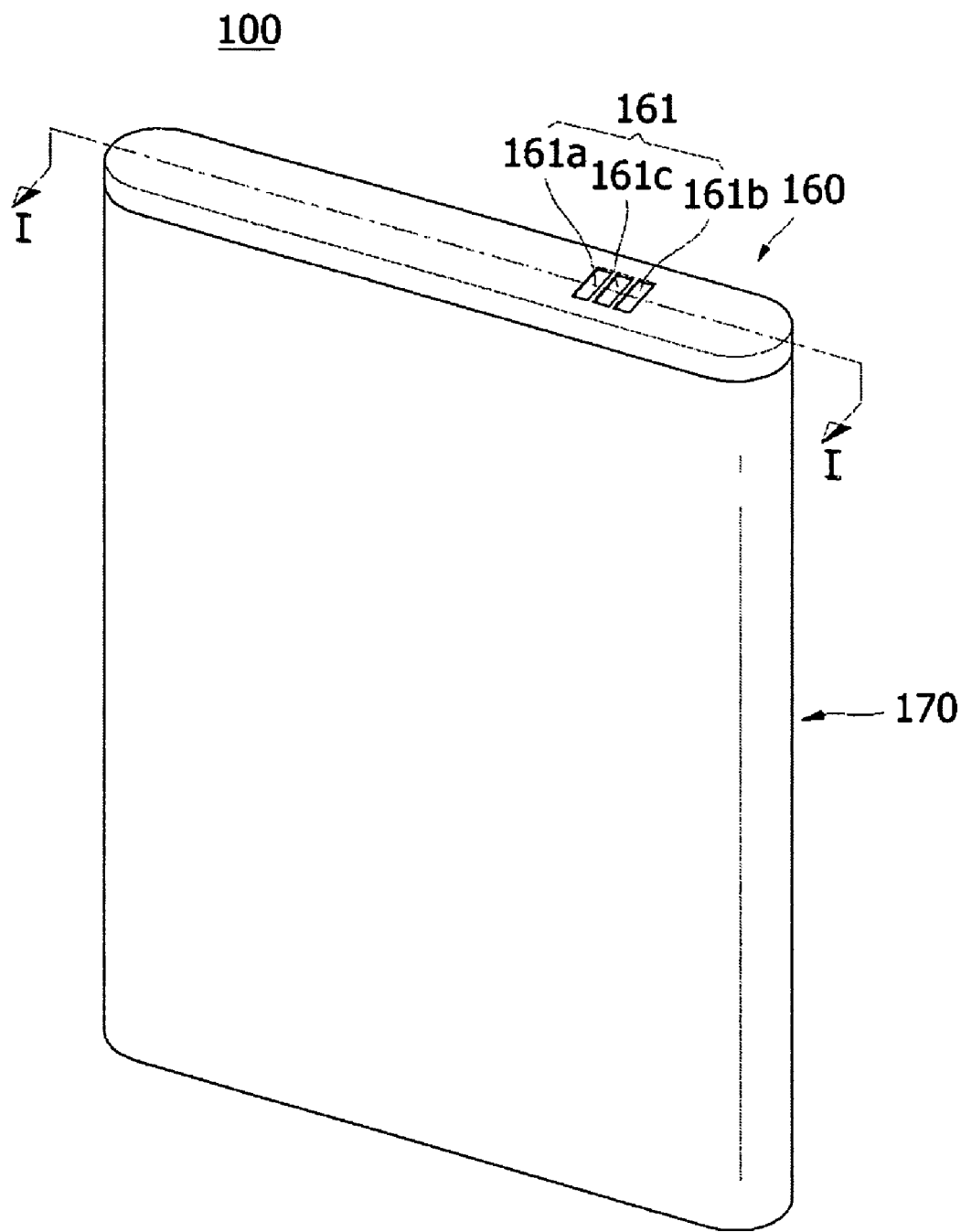
Figure 1D:
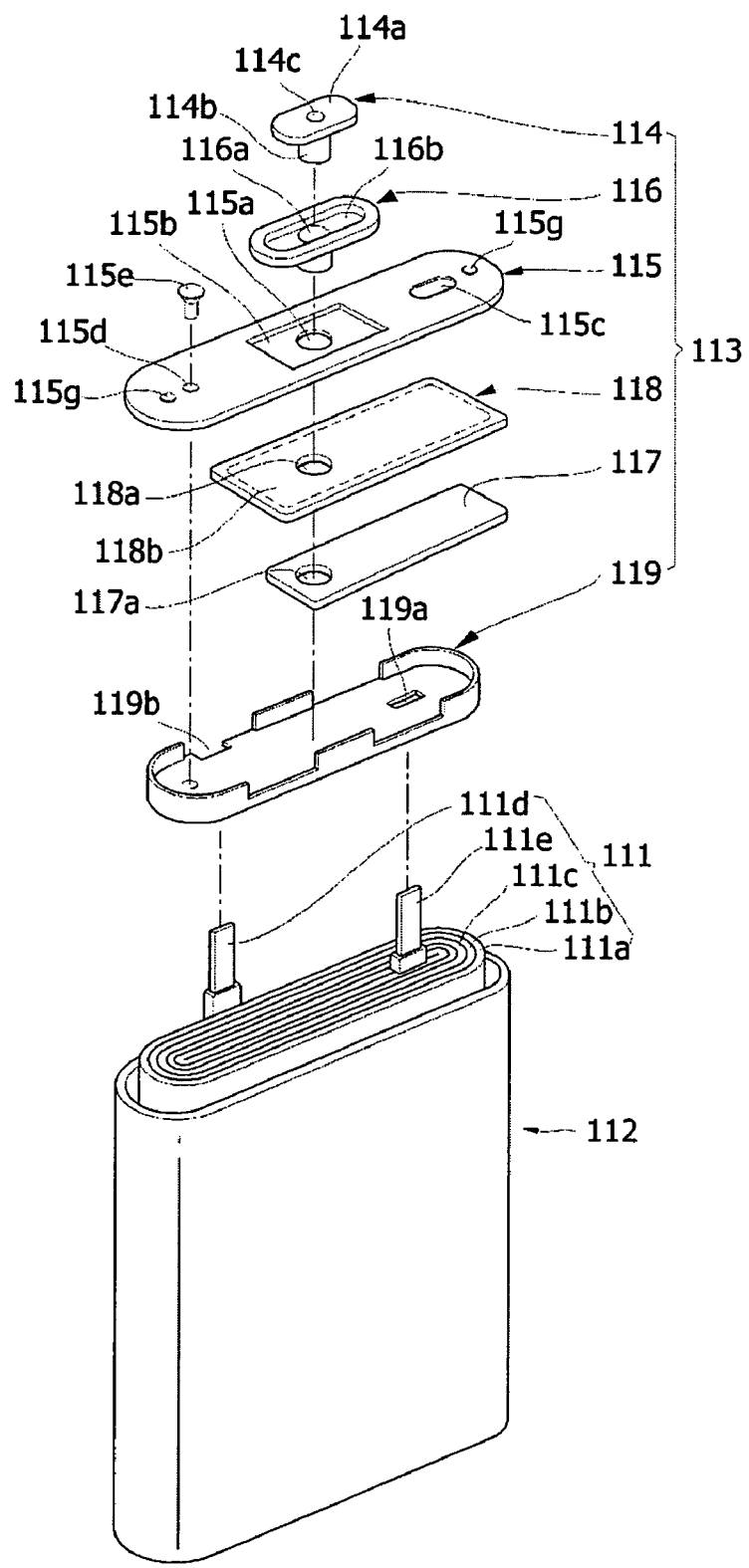
Figure 1E:
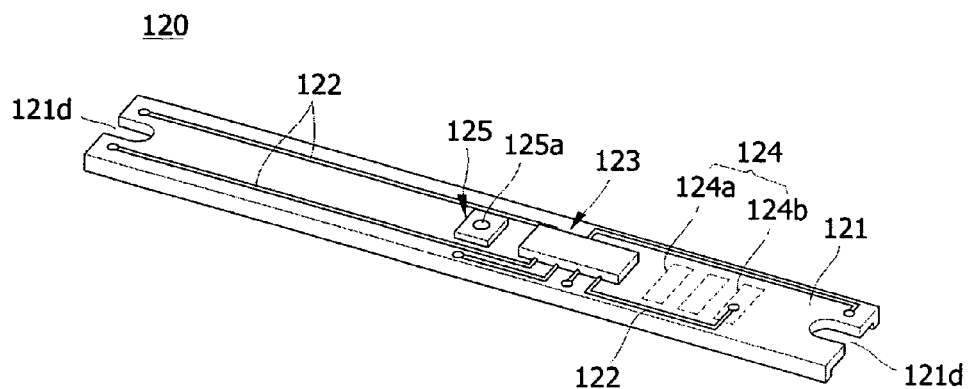
Figure 1F:
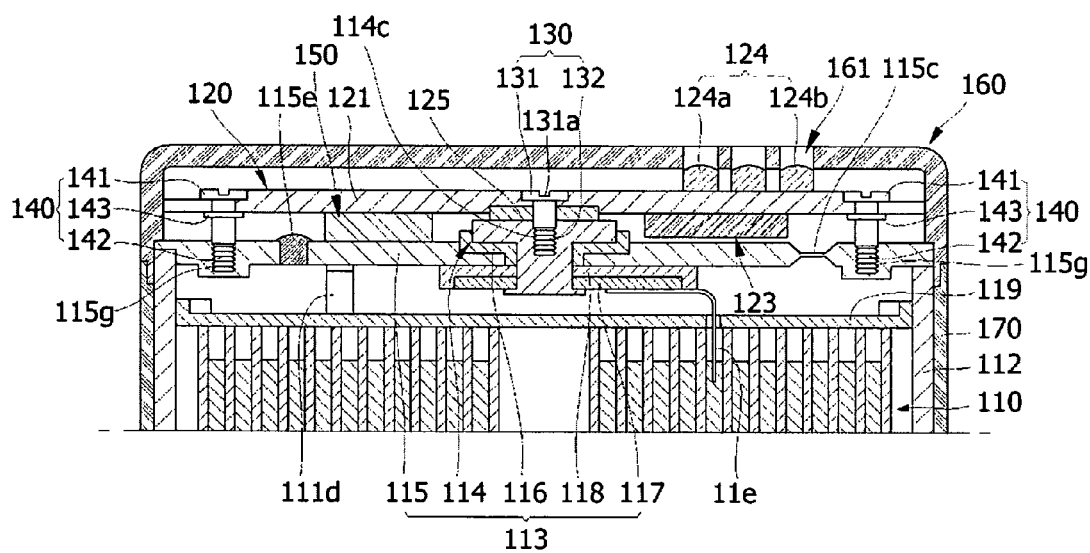
FIG. 1f illustrates a partial sectional view taken along 'I-I' line of FIG. 1c.
Figure 1G:
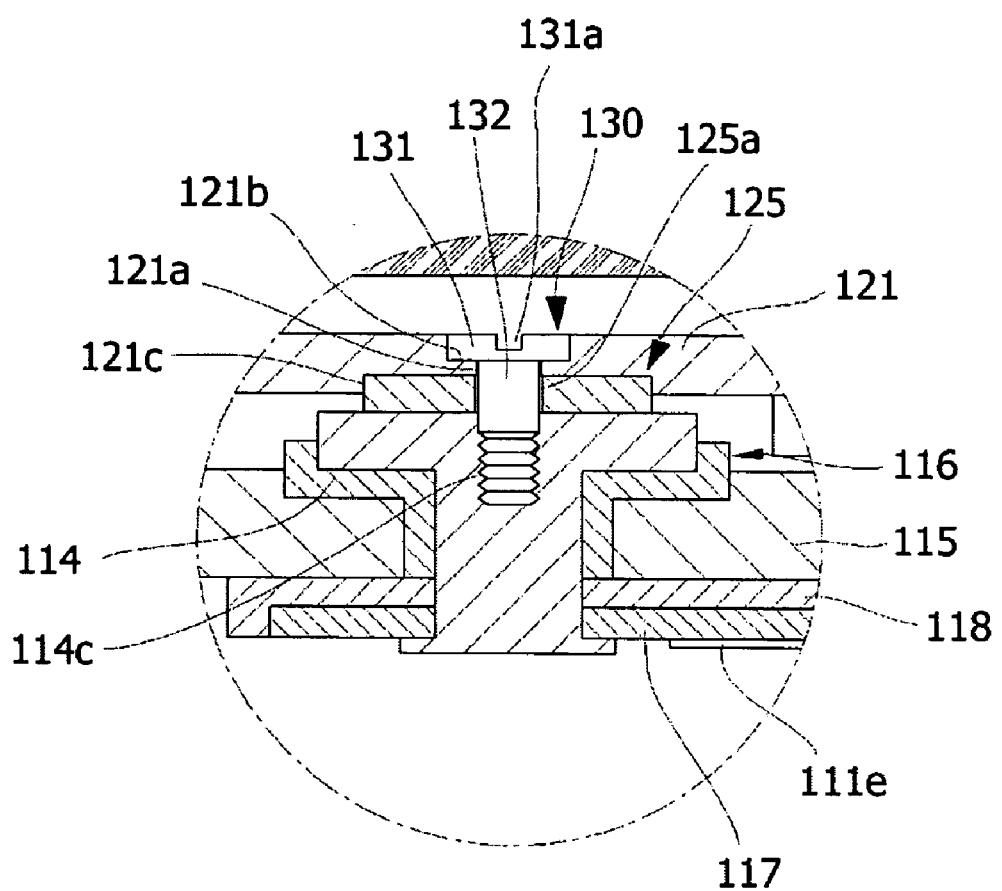
FIG. 1g illustrates a magnified partial sectional view of a peripheral region of an electrode terminal shown in FIG. 1f.

Korean Patent Application No. 10-2008-0036341, filed on Apr. 18, 2008, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an $n^{th}$ member, where n is greater than 3, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B, and C together, whereas the expression "either A, B, or C" means one of A alone, B alone, and C alone, and does not mean any of both A and B together; both A and C together; both B and C together; and all three of A, B, and C together.

As used herein, the terms "a" and "an" are open terms that may be used in conjunction with singular items or with plural items. For example, the term "a conductive material" may represent a single compound, e.g., nickel, or multiple compounds in combination, e.g., nickel mixed with aluminum.

Referring to FIGS. 1a to 1g, a battery pack 100 according to an embodiment may include a cell 110, a circuit board 120, and a bolt 130. The circuit board 120 may be a protection circuit board. In addition, the battery pack 100 may further include a conducting member 140, an insulator 150, a cover 160, and/or an outer case 170.

The cell 110 may be a rechargeable battery having a cathode and an anode. In an embodiment, the cell 110 may include an electrode assembly 111, a can 112, and a cap assembly 113. In addition, the cell 110 may further include an insulating case 119.

The electrode assembly 111 may include a cathode plate 111a, an anode plate 111b, a separator 111c, a cathode tab 111d, and an anode tab 111e. The separator 111c may be interposed between the cathode plate 111a and anode plate 111b. The cathode plate 111a, separator 111c, and anode plate 111b may be wound in a jelly-roll shape to form the electrode assembly 111. In an embodiment, the electrode assembly 111 may have a wide rectangular shape.

The cathode plate 111a may include a cathode collector and a cathode active material layer. The cathode active material layer may include a layered compound containing lithium, a binder for improving bonding strength, and a conducting material for improving conductivity. The cathode collector may be made of, e.g., aluminum, and may support the cathode active material layer.

The anode plate 111b may include an anode collector and an anode active material layer. The anode active material layer may include carbon, e.g., hard carbon or graphite, and a binder for improving bonding strength between active material particles. The anode collector may be made of, e.g., copper, and may support the anode active material layer.

The cathode tab 111d may be electrically coupled to the cathode collector of the cathode plate 111a. The cathode tab 111d may be formed of conductive metal, e.g., aluminum.

The anode tab 111e may be electrically coupled to the anode collector of the anode plate 111b. The anode tab 111e may be formed of conductive metal, e.g., nickel.

The can 112 may include an opening at one end thereof, and may receive the electrode assembly 111 through the opening. In an embodiment, the can 112 may have a wide rectangular shape. The electrode assembly 111 may also have a wide rectangular shape, to be inserted into the wide rectangular can 112. The can 112 may be formed of conductive metal, e.g., aluminum.

The cap assembly 113 may include an electrode terminal 114, a cap plate 115, an insulating gasket 116, a terminal plate 117, and an insulating plate 118. In addition, the cap assembly 113 may further include an insulating case 119.

The electrode terminal 114 may include an electrode terminal head 114a and an electrode terminal body 114b. The electrode terminal head 114a may have a diameter larger than that of the electrode terminal body 114b. A lower surface of the electrode terminal head 114a may be seated in a seating groove 116b of the insulating gasket 116. In addition, a bolt coupling region 114c may be formed on an upper surface of the electrode terminal head 114a. The bolt coupling region 114c may be coupled to threads of the bolt 130. In an embodiment, the bolt coupling region 114c may be formed as, e.g., a groove or a hole.

The electrode terminal body 114b may be connected to the electrode terminal head 114a, and have a diameter smaller than that of the electrode terminal head 114a. The electrode terminal 114 may be formed of, e.g., nickel or nickel-containing alloy, and may be electrically coupled to the circuit board 120.

The cap plate 115 may seal the opening of the can 112. In addition, the cap plate 115 may be electrically coupled to the cathode tab 111d. A cap plate hole 115a may be formed in the middle of the cap plate 115. A seating groove 115b having a diameter larger that that of the cap plate hole 115a may be formed at an upper part of the cap plate hole 115a. In addition, a safety vent 115c, a thinner region of the cap plate 115, may be formed at the cap plate 115. If an internal pressure of the can 112 is increased above a threshold value, the safety vent 115c may be broken to discharge gas generated in the can 112. In addition, an electrolyte injection hole 115d may be formed at the cap plate 115. The electrolyte injection hole 115d may be sealed by a stopper 115e. In addition, a side part coupling groove 115g may be formed at both sides of the cap plate 115. The cap plate 115 may be formed of conductive metal, e.g., aluminum and aluminum-containing alloy.

The insulating gasket 116 may surround a lower surface of the electrode terminal head 114a, and a side surface of the electrode terminal body 114b. An insulating gasket hole 116a may be formed in the middle of the insulating gasket 116, where the electrode terminal body 114b passes through the insulating gasket hole 116a. A seating groove 116b having a diameter larger that that of the insulating gasket hole 116a may be formed at an upper part of the insulating gasket hole 116a. The electrode terminal body 114b may pass through the insulating gasket hole 116a, and the electrode terminal head 114a may be seated in the seating groove 116b. The insulating gasket 116 may insulate the electrode terminal 114 from the cap plate 115. The insulating gasket 116 may be formed of, e.g., polymer resin, to insulate the electrode terminal 114 and cap plate 115 from each other.

A terminal plate hole 117a may be formed at the terminal plate 117, where the electrode terminal body 114b passes through the terminal plate hole 117a. An end of the electrode terminal body 114b may pass through the terminal plate hole 117a and then may be mechanically pressed, thereby forming a pressing part having a diameter larger that that of the terminal plate hole 117a. Accordingly, the electrode terminal 114 may be integrated with the terminal plate 117 by the pressing part. The terminal plate 117 may be formed of conductive metal, e.g., nickel and nickel-containing alloy, and electrically coupled to the electrode terminal 114. In addition, the anode tab 111e may be connected to the terminal plate 117. The anode tab 111e may be integrated with the terminal plate 117 by, e.g., being welded to the terminal plate 117.

The insulating plate 118 may be formed of polymer resin, e.g., polypropylene, to insulate the terminal plate 117 and cap plate 115 from each other. An insulating plate hole 118a may be formed in the insulating plate 118 where the electrode terminal body 114b passes through the insulating plate 118. In addition, an insulating plate groove 118b may be formed in a lower part of the insulating plate 118, to accommodate insertion of the terminal plate 117.

The insulating case 119 may be seated on the upper surface of the cell 110. An anode tab hole 119a may be formed in the insulating case 119, and the anode tab 111e may pass through the anode tab hole 119a. In addition, a cathode tab hole 119b may be formed in the insulating case 119, and the cathode tab 111d may pass through the cathode tab hole 119b. The insulating case 119 may prevent a short circuit between the upper surface of the cell 110 and the cathode tab 111d and anode tab 111e.

The circuit board 120 may include an insulating substrate 121, a printed circuit pattern 122, a protection circuit unit 123, and a charging/discharging terminal 124. In addition, the circuit board 120 may further include a conducting pad 125.

The insulating substrate 121 may have a plate shape. The insulating substrate 121 may be formed by stacking a plurality of layers of insulating substrate material. In addition, the insulating substrate 121 may include a via hole (not shown) and a contact groove (not shown). The insulating substrate 121 may be formed of, e.g., bakelite type resin or epoxy type resin.

The insulating substrate 121 may include a bolt through-hole 121a at a position corresponding to the bolt coupling region 114c. In addition, the insulating substrate 121 may include a bolt head seating groove 121b larger than the diameter of the bolt through-hole 121a at the upper part of the bolt through-hole 121a.

In addition, the insulating substrate 121 may include a conducting pad insertion groove 121c larger than the diameter of the bolt through-hole 121a at the lower part of the bolt through-hole 121a. A conducting member insertion groove 121d may be formed at both side parts of the insulating substrate 121.

The printed circuit pattern 122 may be formed on upper and lower surfaces of the insulating substrate 121. In addition, the printed circuit pattern 122 may be formed between the plurality of stacked layers of insulating substrate material. In addition, the printed circuit pattern 122 may be formed at the via hole and contact groove (not shown) to electrically couple the upper and lower printed circuit patterns. The printed circuit pattern 122 may electrically couple an anode terminal 124b and the protection circuit unit 123. In addition, the printed circuit pattern 122 may electrically couple the conducting pad 125 and protection circuit unit 123. In addition, the printed circuit pattern 122 may electrically couple the conducting member 140 and a cathode terminal 124a.

The protection circuit unit 123 may include a passive element (not shown) having a capacitor and a resistor, and an active element (not shown) having a diode and a field effect transistor. The protection circuit unit 123 may also include a protection integrated circuit interrupting or connecting a current path of the cathode or anode of the cell 110. The protection circuit unit 123 may be soldered to the printed circuit pattern 122. The protection circuit unit 123 may be electrically coupled to the anode terminal 124b by the printed circuit pattern 122. In addition, the protection circuit unit 123 may be electrically coupled to the charging/discharging terminal 124 by the printed circuit pattern 122.

The charging/discharging terminal 124 may include the cathode terminal 124a and anode terminal 124b. In addition, the charging/discharging terminal 124 may further include a supplementary terminal interposed between the cathode terminal 124a and anode terminal 124b. The charging/discharging terminal 124 may be soldered to the printed circuit pattern 122. The anode terminal 124b may be electrically coupled to the protection circuit unit 123.

The conducting pad 125 may be between, and electrically couple, the circuit board 120 and electrode terminal 114. The conducting pad 125 may be electrically coupled to the printed circuit pattern 122.

A conducting pad hole 125a may be formed in the conducting pad 125, and the bolt body 132 of the bolt 130 may pass through the conducting pad hole 125a. The lower surface of the conducting pad 125, except for the conducting pad hole 125a, may be connected to the electrode terminal 114. The conducting pad 125 may be strongly coupled to the electrode terminal 114 by the bolt body 132 of the bolt 130 passing through the conducting pad hole 125a. In other words, the conducting pad hole 125a may improve coupling strength between the electrode terminal 114 and conducting pad 125, while maximizing the connecting area between the electrode terminal 114 and conducting pad 125. Accordingly, contact resistance between the electrode terminal 114 and conducting pad 125 may be advantageously decreased.

In addition, the conducting pad 125 may be inserted into a conducting pad insertion groove 121c of the circuit board 120. The conducting pad 125 may be electrically coupled to the electrode terminal 114 while in the conducting pad insertion groove 121c. In other words, a distance between the upper surface of the circuit board 120 and the lower surface of the cell 110 may be reduced by the conducting pad insertion groove 121c, and thus the volume of the battery pack 100 may be beneficially reduced.

The protection circuit unit 123 may measure voltages of the cathode and anode of the cell 110. The protection circuit unit 123 may turn on/off the field effect transistor in the event of an overcharge, an overdischarge, an overcurrent, and/or an overheating. For example, when the electrode assembly 111 is overcharging, overcurrent, and/or overheating, the protection circuit unit 123 may interrupt current flow between the electrode terminal 114 and anode terminal 124b by turning off the field effect transistor with a control signal. In other words, under emergency conditions, e.g., overcharge, overcurrent, and/or overheating, the circuit board 120 may interrupt current flow between the electrode terminal 114 and anode terminal 124b, improving safety.

The bolt 130 may include a bolt head 131 and a bolt body 132. The bolt head 131 may be seated in the bolt head seating groove 121b of the circuit board 120. The bolt head seating groove 121b may prevent the bolt head 131 from projecting above the upper surface of the circuit board 120. Accordingly, the distance between the upper surface of the circuit board 120 and the lower surface of the cell 110 may be reduced, and thus the overall volume of the battery pack 100 may be desirably reduced. The bolt head 131 may have, e.g., a circular plate shape or a dish shape. In addition, when the bolt head 131 has a dish shape, the bolt head seating groove 121b may also have a dish shape.

The bolt body 132 may be attached to the bolt head 131, and have a diameter smaller than that of the bolt head 131. Threads may be formed on an outer circumference surface of the bolt body 132. The threads may be coupled to the bolt coupling region 114c. The bolt body 132 may pass through the bolt through-hole 121a of the circuit board 120 and the conducting pad hole 125a of the conducting pad 125.

Two conducting members 140 may be provided. The conducting member 140 may include a conducting member head 141, a conducting member body 142, and a conducting member projection 143.

The conducting member head 141 may include a screw driver coupling groove 141a. The conducting member head 141 may be seated on an upper surface of the conducting member insertion groove 121d. In addition, the conducting member head 141 may be electrically coupled to the printed circuit pattern 122 of the circuit board 120.

The conducting member body 142 may be attached to the conducting member head 141, and have a diameter smaller than that of the conducting member head 141. Threads may be formed on the conducting member body 142, and the threads may be coupled to a side part coupling groove 115g. The conducting member body 142 may be electrically coupled to the cap plate 115.

The conducting member projection 143 may be spaced at a distance from the conducting member head 141. The conducting member projection may project at the circumference surface of the conducting member body 142. The conducting member head 141 may contact a lower surface of the conducting member insertion groove 121d. The conducting member 140 may be coupled to the conducting member insertion groove 121d when the conducting member head 141 is seated on the upper surface of the conducting member insertion groove 121d.

The conducting member 140 may electrically couple the cell 110 and circuit board 120. The conducting member 140 may electrically couple the cap plate 115, as the cathode, to the cathode terminal 124a of the charging/discharging terminal 124. In other words, the conducting member 140 may stably connect the cathode current path of the cell 110 to the circuit board 120. The conducting member 140 may prevent misalignment of the circuit board 120 by fixing the position of the circuit board 120. In addition, the conducting member 140 may connect the circuit board 120 to the cell 110 by the bolt 130, thereby easing assembly of the battery pack 100.

The insulator 150 may include, e.g., foam tape, and may fill in a space between the circuit board 120 and cell 110 to insulate them from each other. The insulator 150 may attach to the cell 110 by, e.g., adhesive on a surface thereof. The insulator 150 may prevent direct electrical contact between the circuit board 120 and cell 110, even if the battery pack 100 is crushed. Thus, operation error of the protection circuit unit 123 may be prevented, allowing the protection circuit unit 123 to operate as a normal protection circuit. Safety of the battery pack 100 is thereby improved.

The cover 160 may prevent the circuit board 120 from being exposed to the outside by surrounding the circuit board 120. In addition, the cover 160 may protect the protection circuit unit 123 by preventing discharge of static electricity supplied from the outside. In addition, the cover 160 may protect the circuit board 120 from external impact by surrounding the circuit board 120. The cover 160 may be, e.g., an injection molded article that is formed by, e.g., melting polymer resin.

In addition, the cover 160 may include a charging/discharging terminal hole 161. The charging/discharging terminal hole 161 may include a cathode terminal hole 161a, an anode terminal hole 161b, and a 161c. An upper surface of the charging/discharging terminal 124 may be exposed through the charging/discharging terminal hole 161.

The outer case 170 may include a label with adhesive inside. Characters indicating information of the battery pack 100 may be printed on the edge surface of the outer case 170. In addition, the outer case 170 may integrate the cell 110 and cover 160 by surrounding edge surfaces of the cell 110 and cover 160 simultaneously. Bonding strength between the cover 160 and cell 110 may be improved by the outer case 170. Thus, even if the battery pack 100 is attached or detached from a battery receiving space of a portable electronic device, the cover 160 may not become dislodged from the position where it attaches to the cell 110.

Operation of the battery pack 100 will be explained below.

In the battery pack 100, the circuit board 120 may be coupled to the electrode terminal 114 by the bolt 130. Thus, the circuit board 120 may be integrated with the cell 110, thereby easing assembly of the battery pack 100.

In addition, internal resistance between the electrode terminal 114 and the circuit board 120 may be beneficially reduced, because the coupling strength between the electrode terminal 114 and conducting pad 125 may be desirably increased by the bolt 130. In other words, conductivity between the electrode terminal 114 and circuit board 120 may be improved. Accordingly, conductivity of the battery pack 100 may be improved. The internal resistance may be kept very low even if the battery pack 100 is used for a long time. Thus, the rate of degradation of the electrode assembly 111 may be advantageously decreased.

In addition, in the battery pack 100, the distance between the upper surface of the circuit board 120 and the lower surface of the cell 110 may be reduced because the conducting pad 125 may be inserted into the circuit board 120. In addition, the distance between the upper surface of the circuit board 120 and the lower surface of the cell 110 may be reduced because the bolt head 131 of the bolt 130 may also be inserted into the circuit board 120. Thus, installation performance of the battery pack 100 may be improved. The volume occupied by the battery pack 100 of an embodiment in a portable electronic device may be beneficially reduced.

Figure 2A:
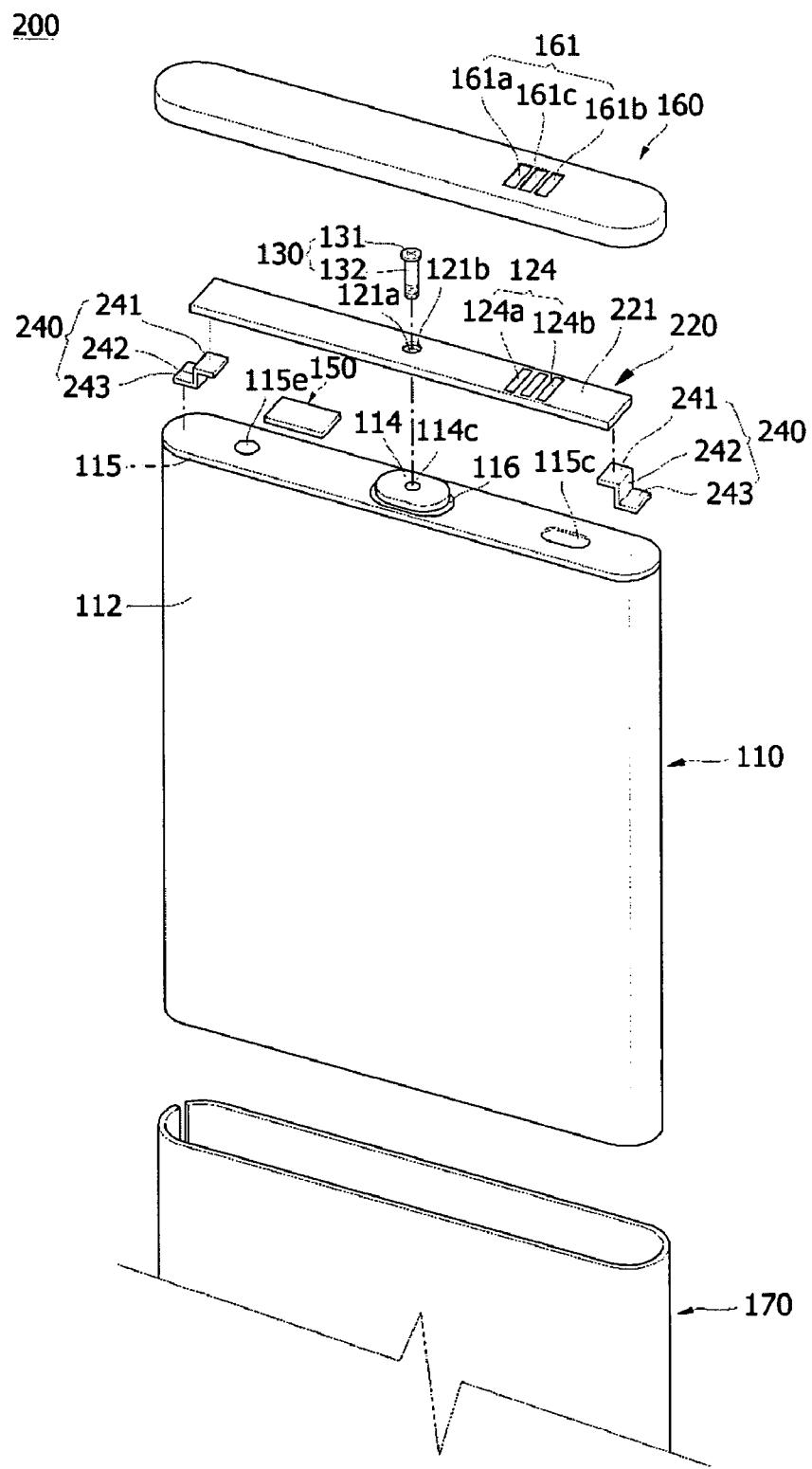
FIG. 2a illustrates an exploded perspective view of a battery pack according to an embodiment.
Figure 2B:
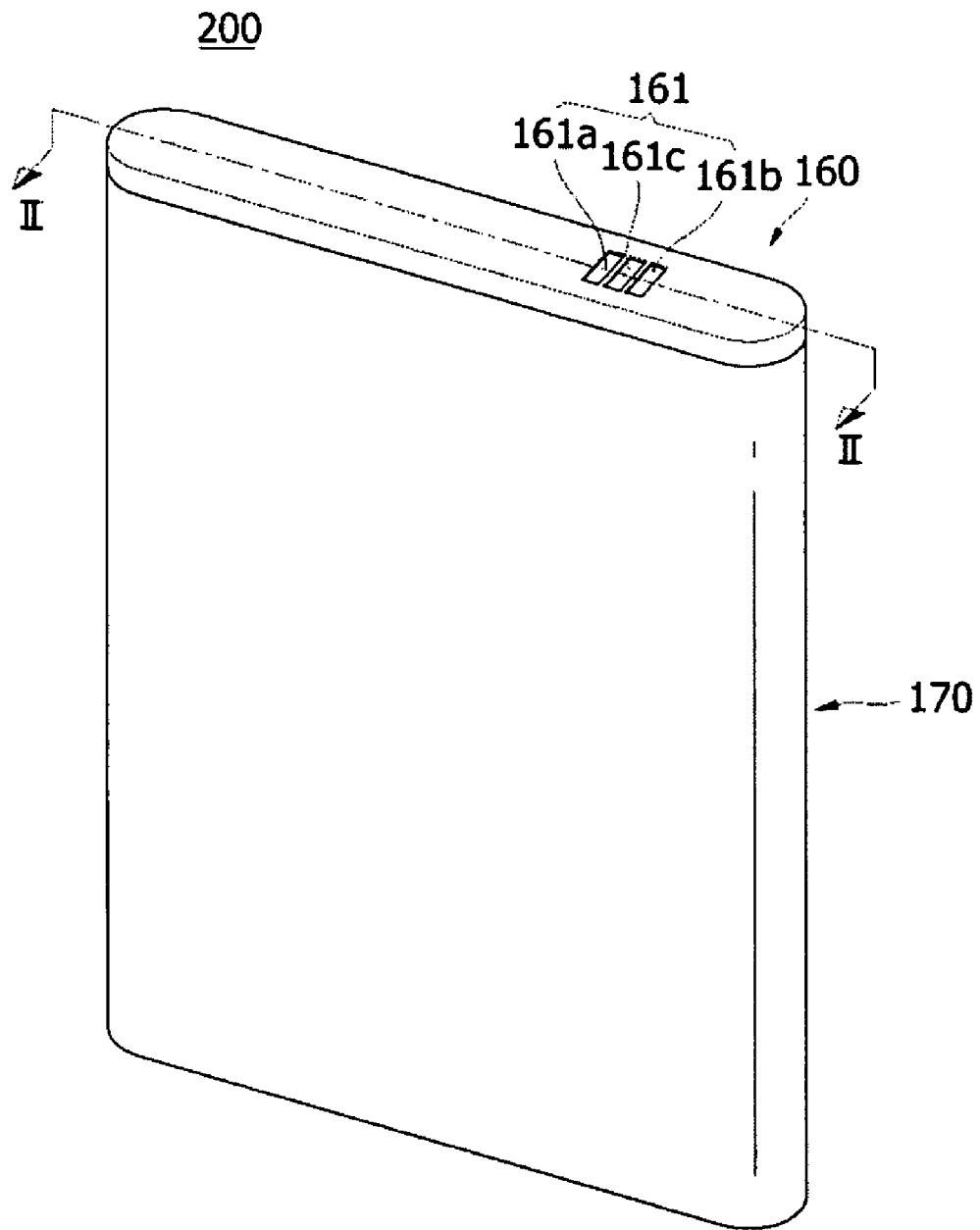
Figure 2C:
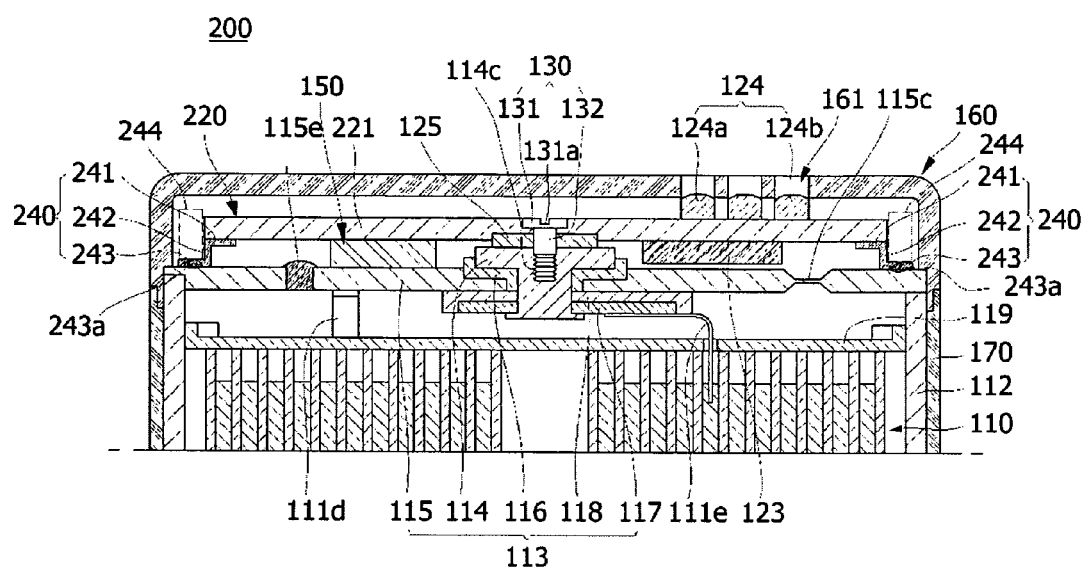
FIG. 2c illustrates a sectional view taken along 'II-II' line of FIG. 2b.

Referring to FIGS. 2a to 2c, the battery pack 200 may include a cell 110, a circuit board 220, and a bolt 130. In addition, the battery pack 200 may further include a conducting member 240, an insulator 150, a cover 160, and/or an outer case 170. In an embodiment, the cell 110, bolt 130, cover 160, and outer case 170 may be the same or similar to the elements as described above, and explanation about them will be omitted. In addition, explanation about the same or similar elements corresponding to those of the above described embodiment will be also omitted. In the embodiment, the circuit board 220 and a conducting member 240 will be mainly explained. The circuit board 220 may have a shape similar to that of the above described circuit board 120 except that the insulating substrate 221 does not include a conducting member insertion groove 121d. In addition, although two conducting members 240 are illustrated in the drawing, one conducting member may be effectively used.

The conducting member 240 may include a first region 241, a second region 242, and a third region 243. The first region 241 may be soldered, and electrically coupled, to the circuit board 220. The first region 241 may be electrically coupled to a cathode terminal 124b of a charging/discharging terminal 124 on the circuit board 220.

The second region 242 may be connected to the first region 241, and bent with respect to the first region 241. It may be desirable that the second region 242 be bent perpendicularly to the first region 241, to desirably reduce assembling error between the circuit board 220 and cell 110.

The third region 243 may be connected to the second region 242, and bent with respect to the second region 242. The third region 243 may be bent away from the first region 241. It may be desirable that the third region 243 be bent perpendicularly to the second region 242, to beneficially reduce assembling error between the circuit board 220 and cell 110.

In addition, a surface of the third region 243 may be connected to a surface of the cell 110. A laser welding part 243a may be formed in the third region 243. The laser welding part 243a may include a portion where the third region 243 and cap plate 115 may be melted and hardened together. In other words, the laser welding part 243a may combine the conducting member 240 to the cap plate 115 of the cell 110. In addition, the conducting member 240 may be electrically coupled to the cap plate 115. If the cap plate 115 acts as a cathode, the conducting member 240 coupled to the cap plate 115 may also act as a cathode.

A welding space 244 for forming the laser welding part 243a may be provided by bending the second region 242 and third region 243 of the conducting member 240. The welding space 244 may be a path through which a laser for forming the laser welding part 243a may be vertically irradiated.

In the battery pack 200, the conducting member 240 may be soldered to the circuit board 220 and welded to the cell 110. Thus, bonding strength between the cell 110 and circuit board 220 may be desirably improved. In addition, the conducting member 240 may act as a cathode, while the electrode terminal 114 may act as an anode. The protection circuit unit 123 may improve stability of the battery pack 200 by interrupting the anode current path of the cell 110 under emergency conditions, e.g., overcharging, overcurrent and overheating. In addition, the bonding strength of the battery pack 200 may be improved by the conducting member 240, thereby improving the conductivity between the cell 110 and circuit board 220. Also, the conducting member 240 may prevent misalignment of the circuit board 220 and cell 110, and thus, easing assembly of the battery pack 200.

Figure 3A:
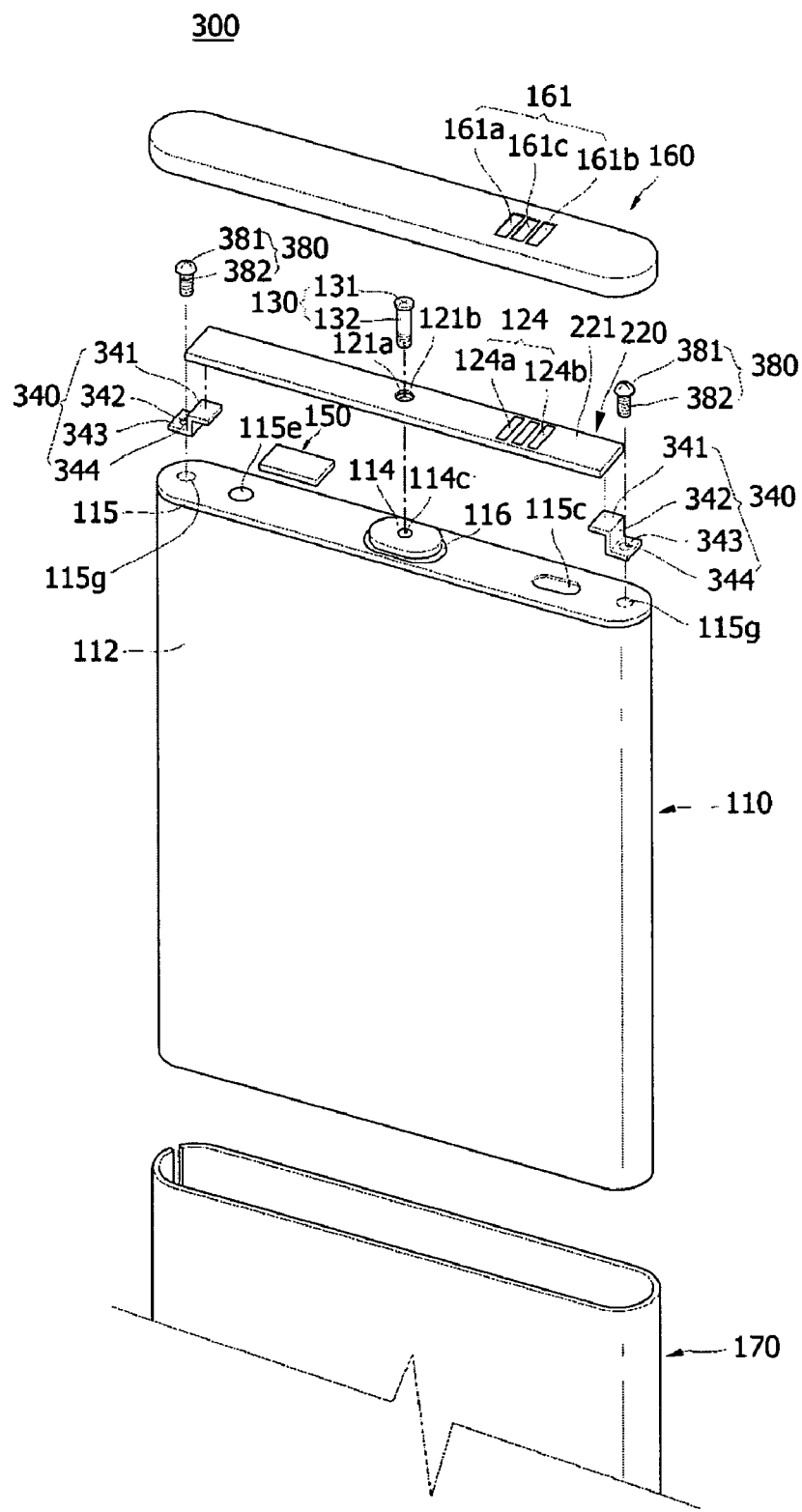
FIG. 3a illustrates an exploded perspective view of a battery pack according to an embodiment.
Figure 3B:
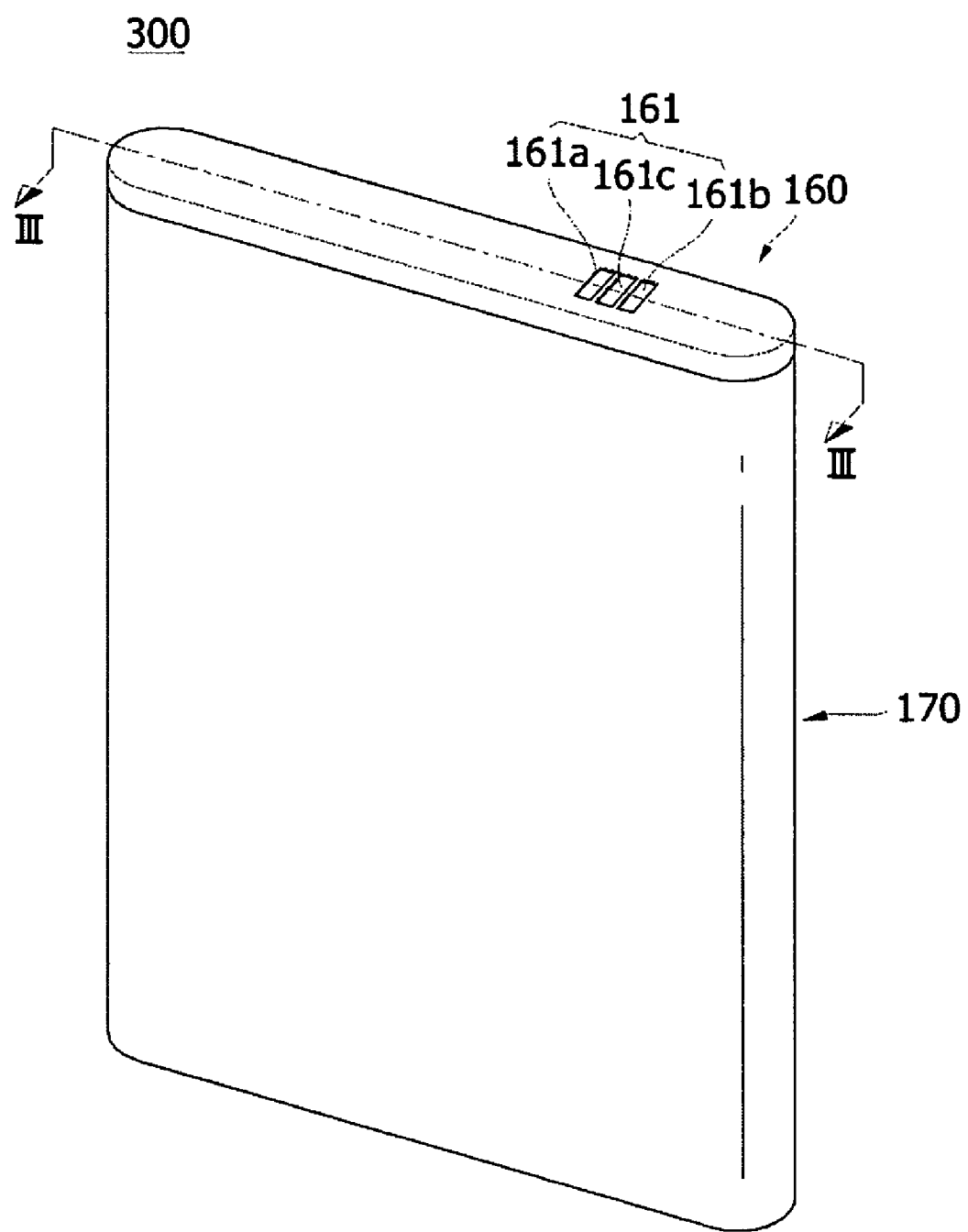
Figure 3C:
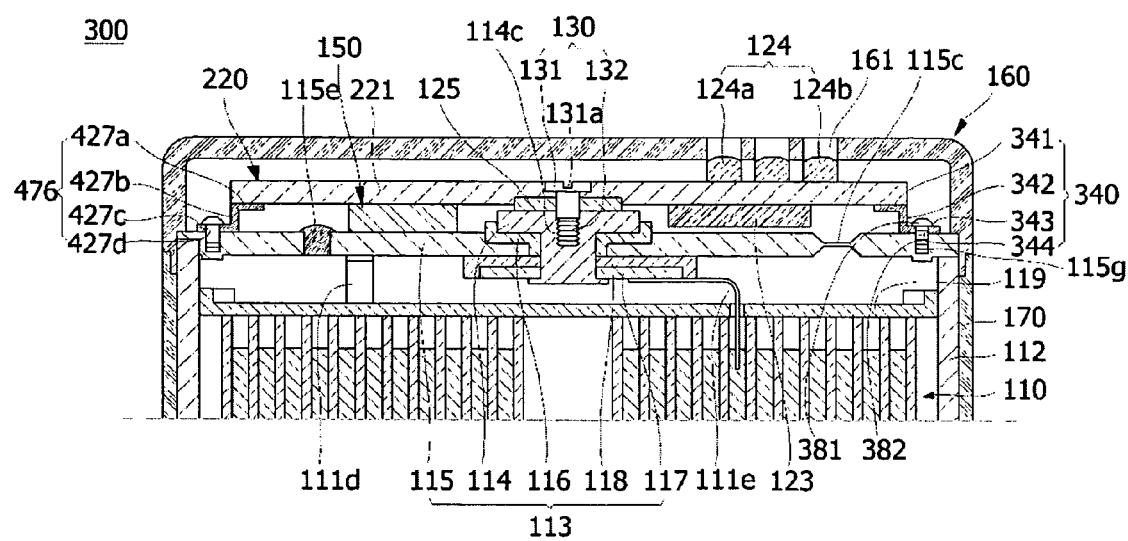
FIG. 3c illustrates a sectional view taken along 'III-III' line of FIG. 3b.
Figure 4A:
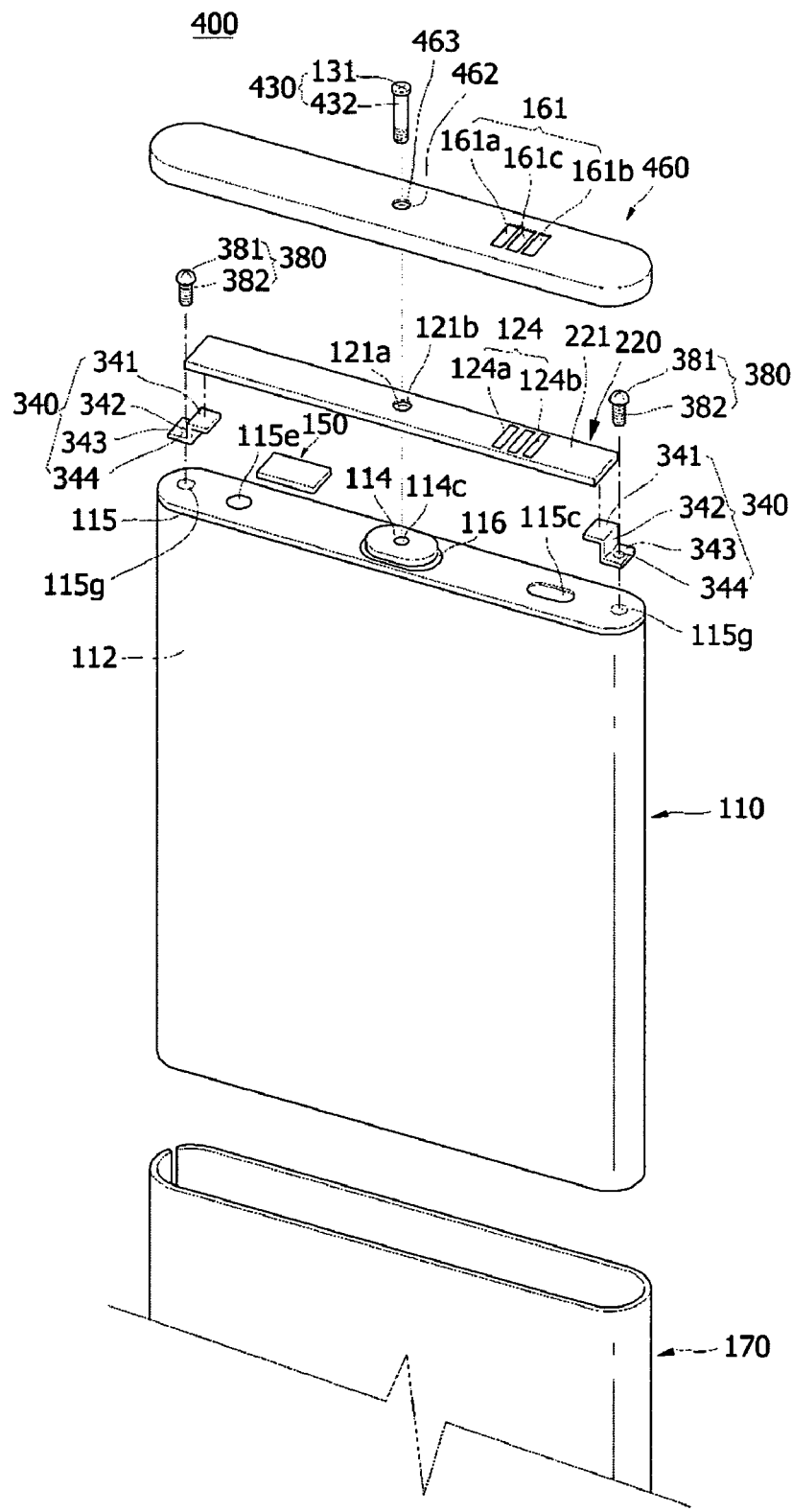
FIG. 4a illustrates an exploded perspective view of a battery pack according to an embodiment.
Figure 4B:
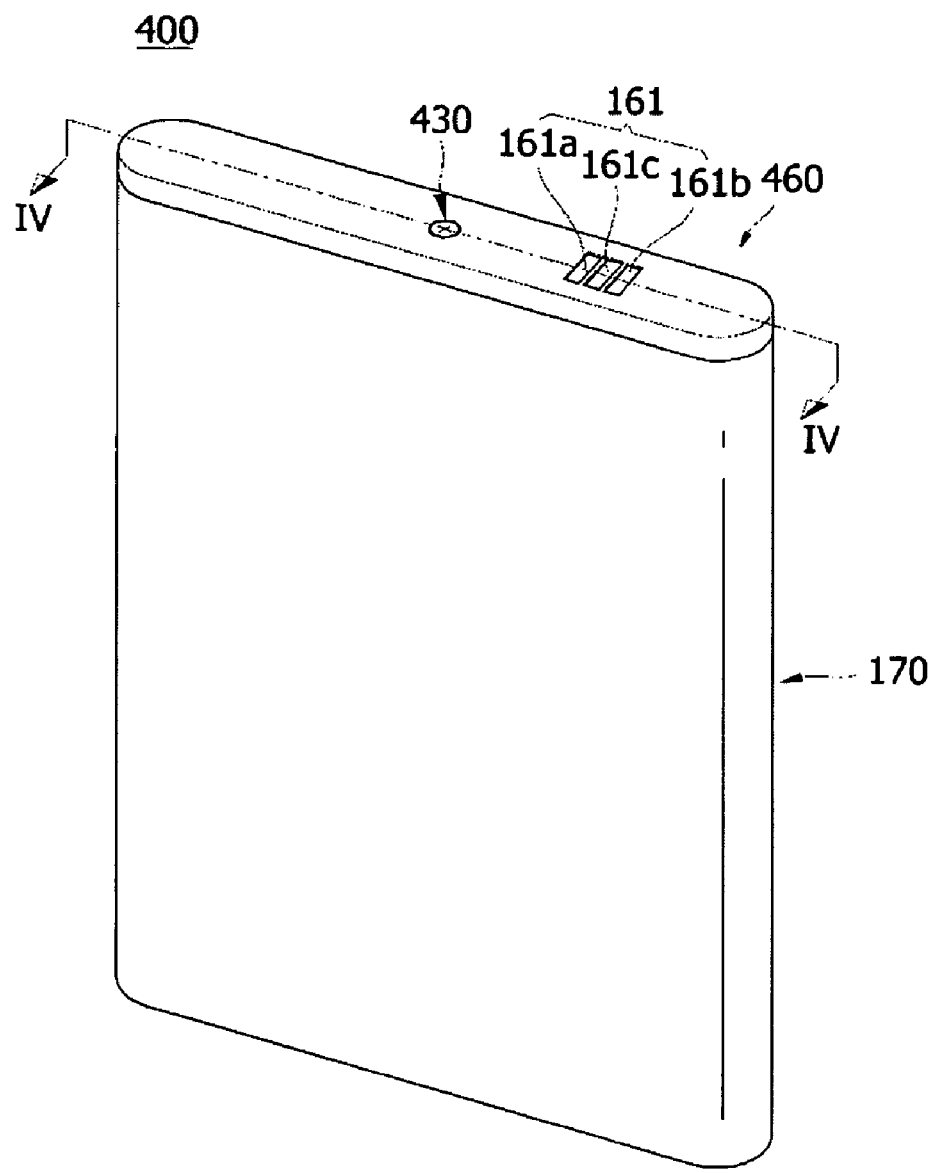
Figure 4C:
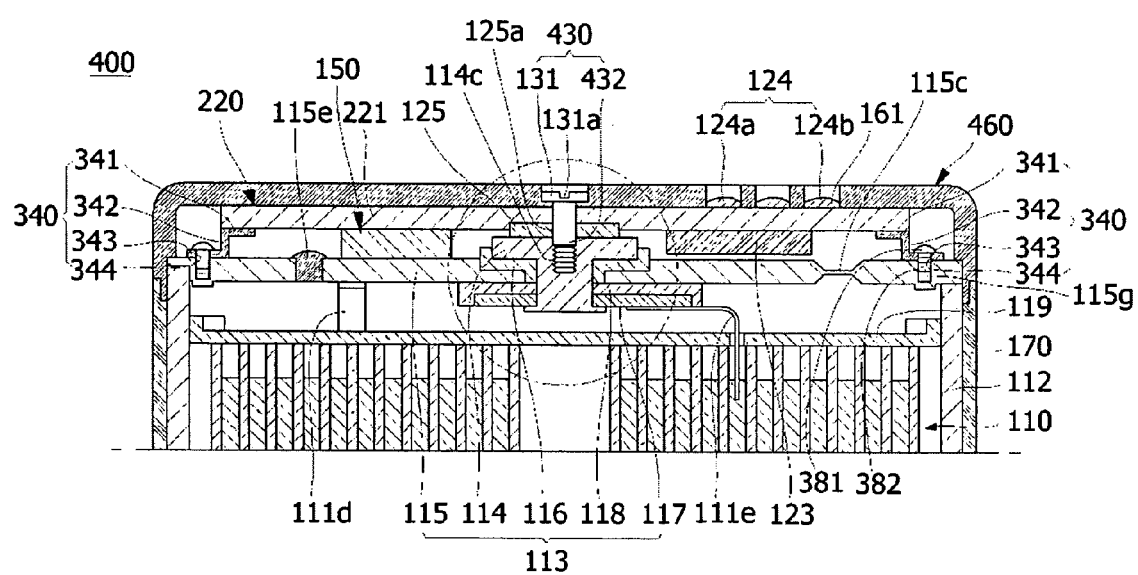
FIG. 4c illustrates a sectional view taken along 'IV-IV' line of FIG. 4b.
Figure 4D:
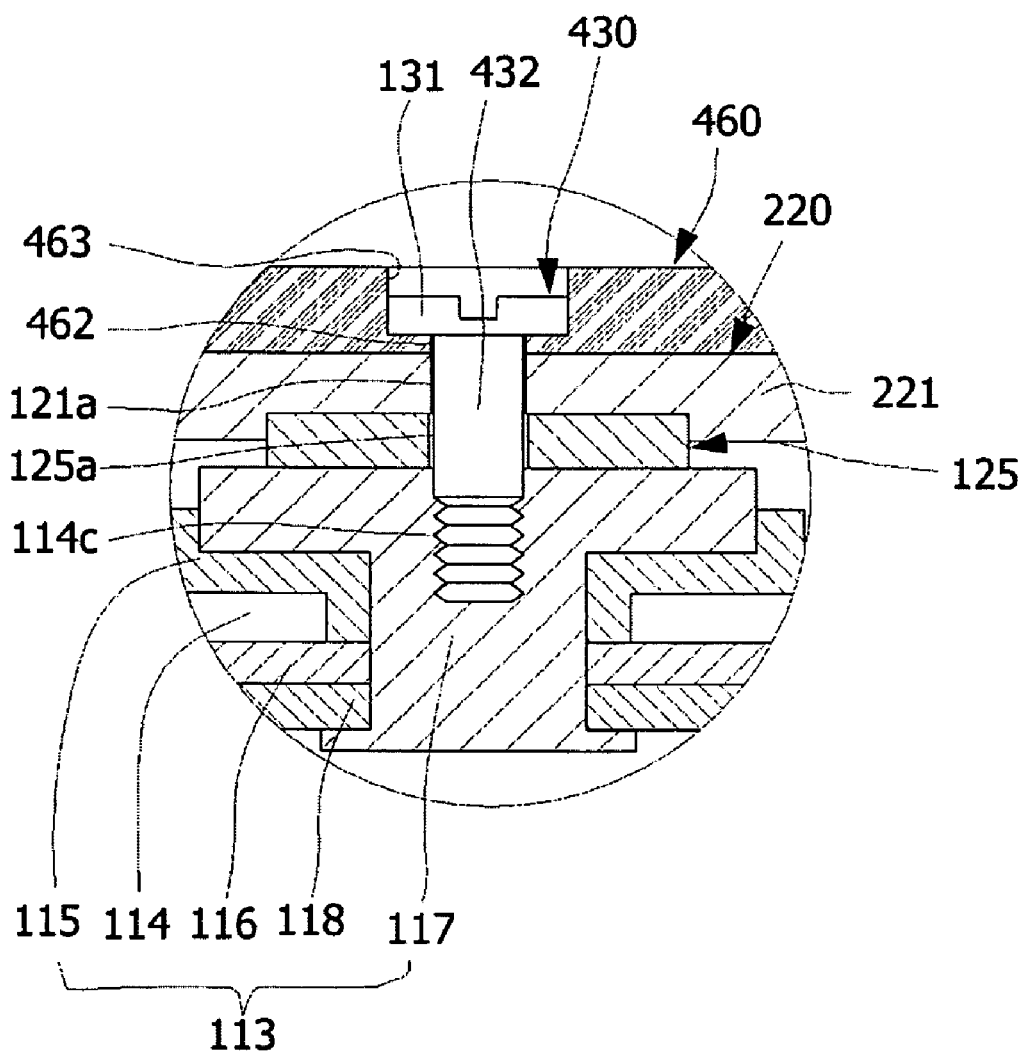
FIG. 4d illustrates a magnified partial sectional view of a central region of an electrode terminal shown in FIG. 4c.
Figure 5A:
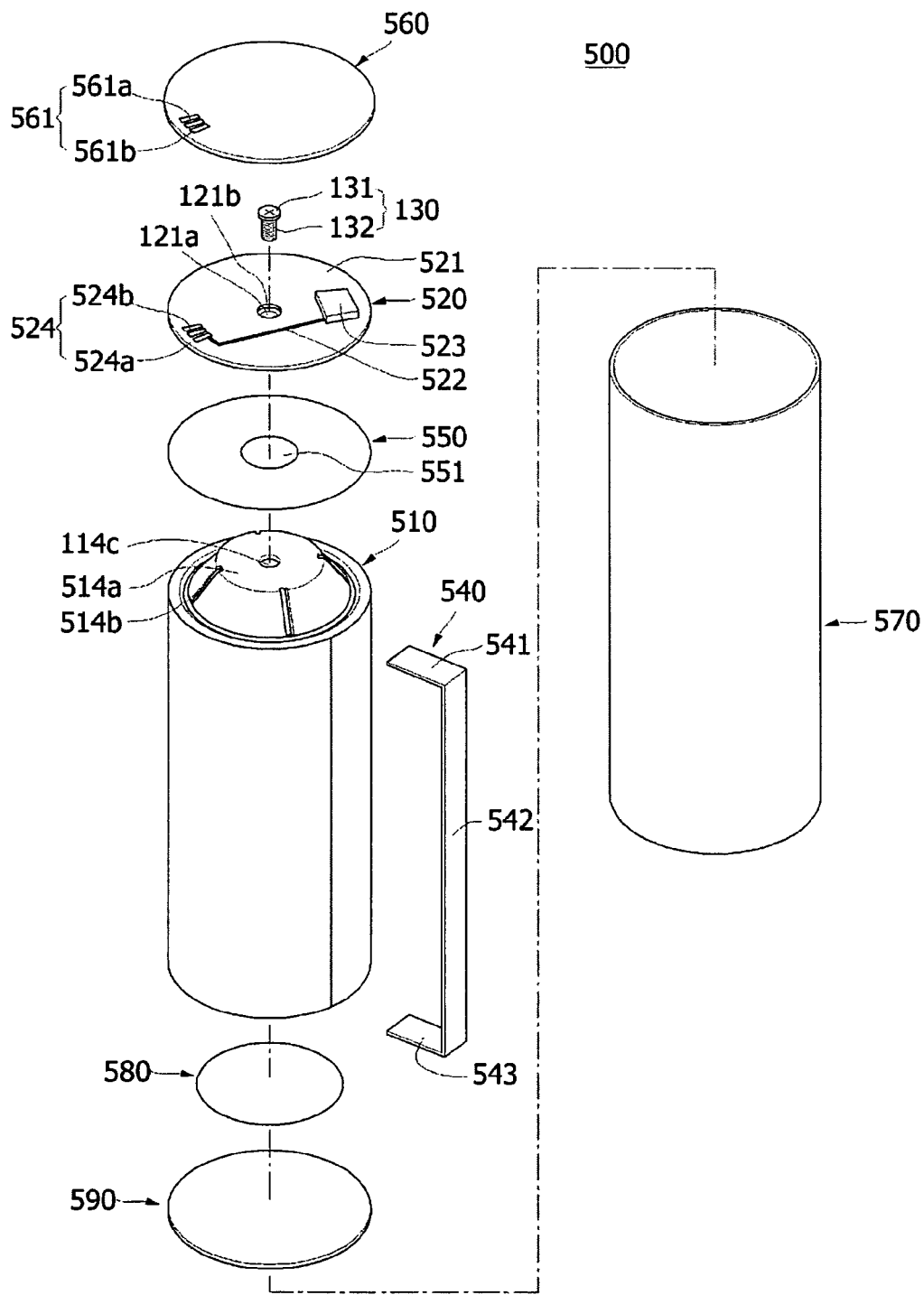
FIG. 5a illustrates an exploded perspective view of a battery pack according an embodiment.
Figure 5B:
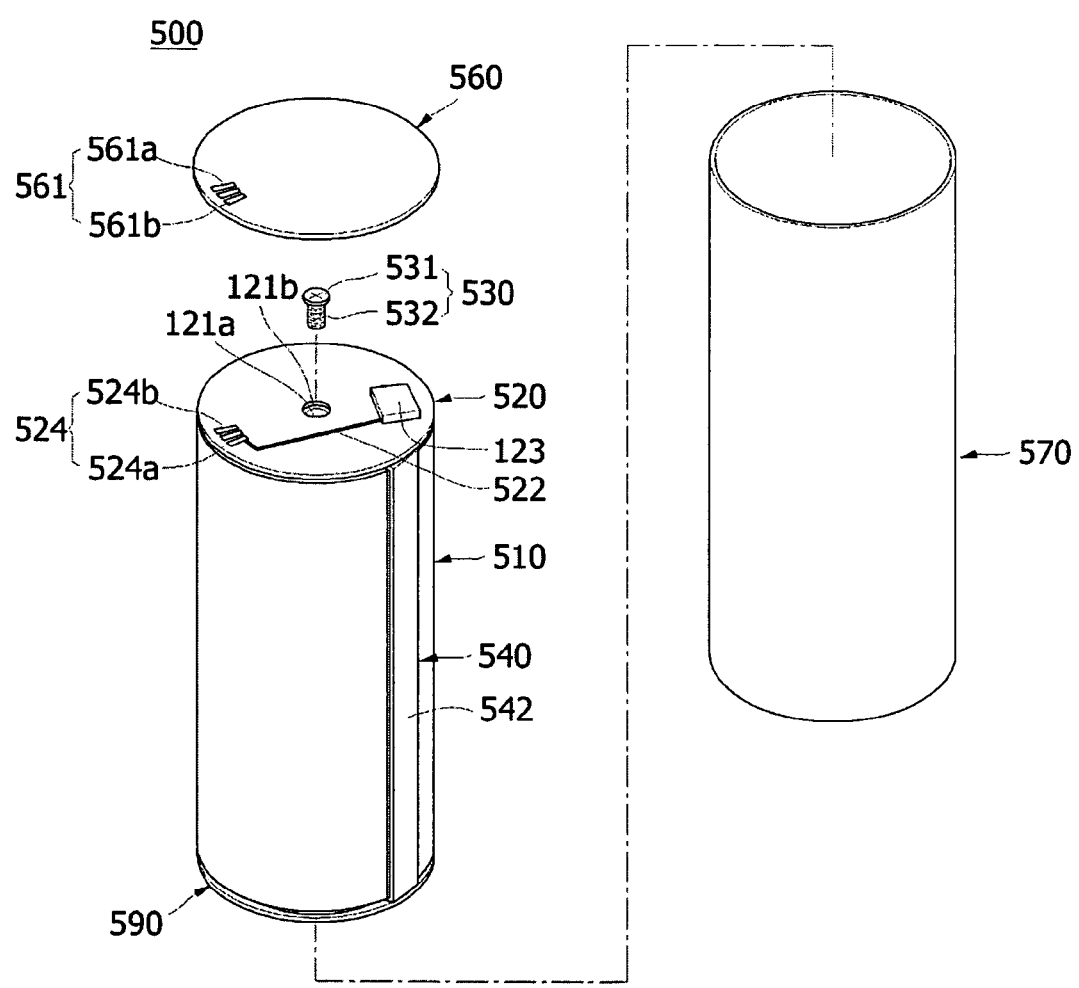
Figure 5C:
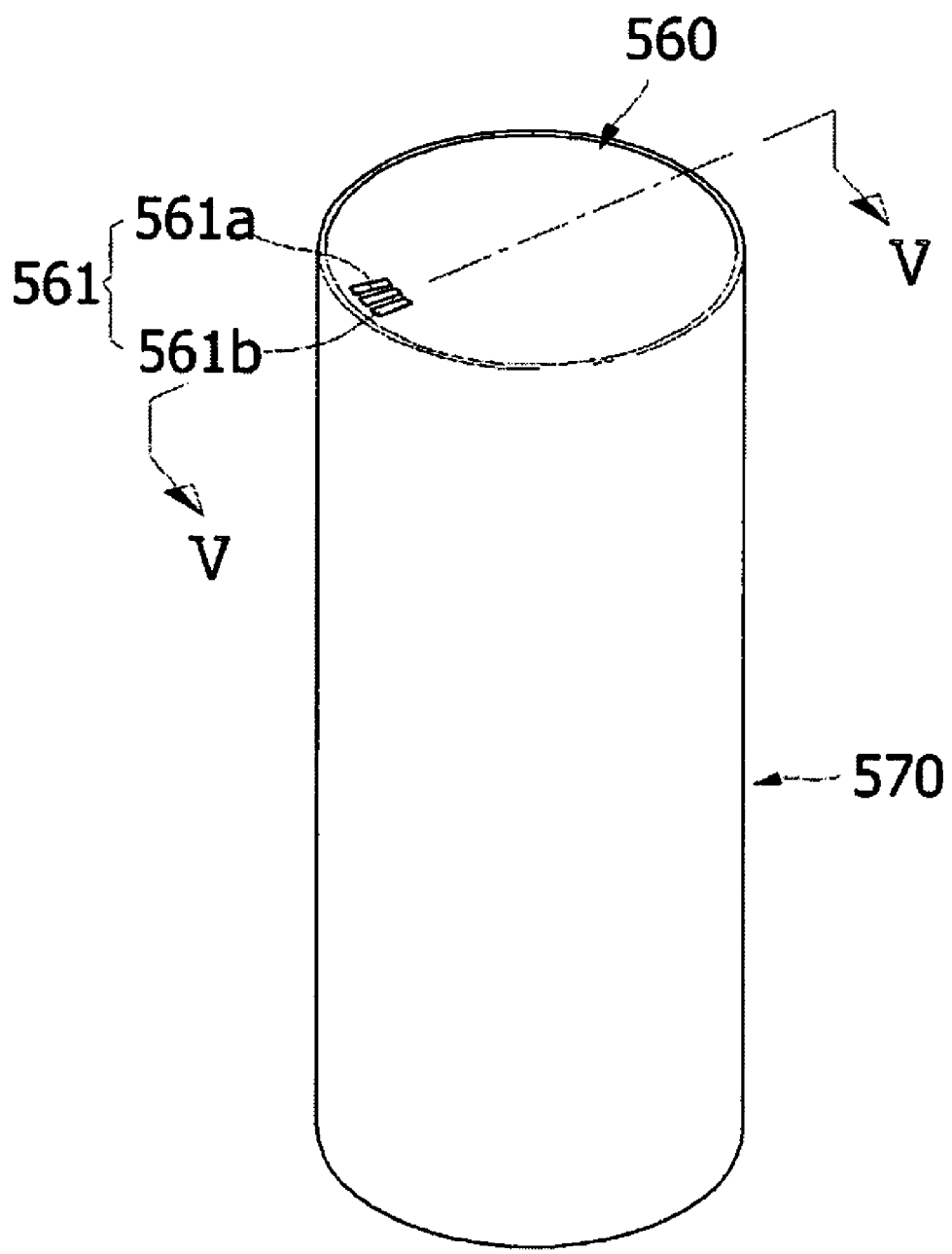
Figure 5D:
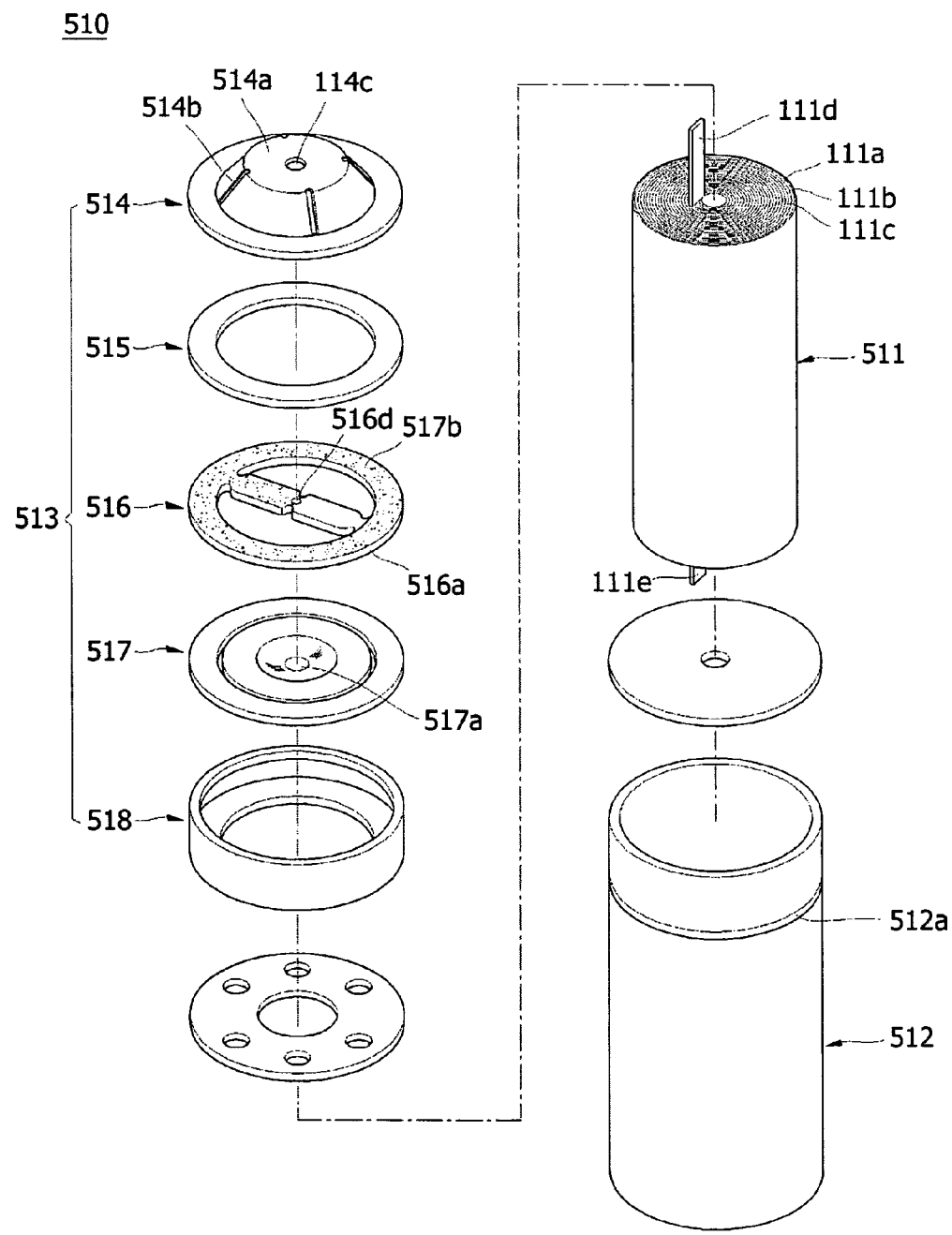
Figure 5E:
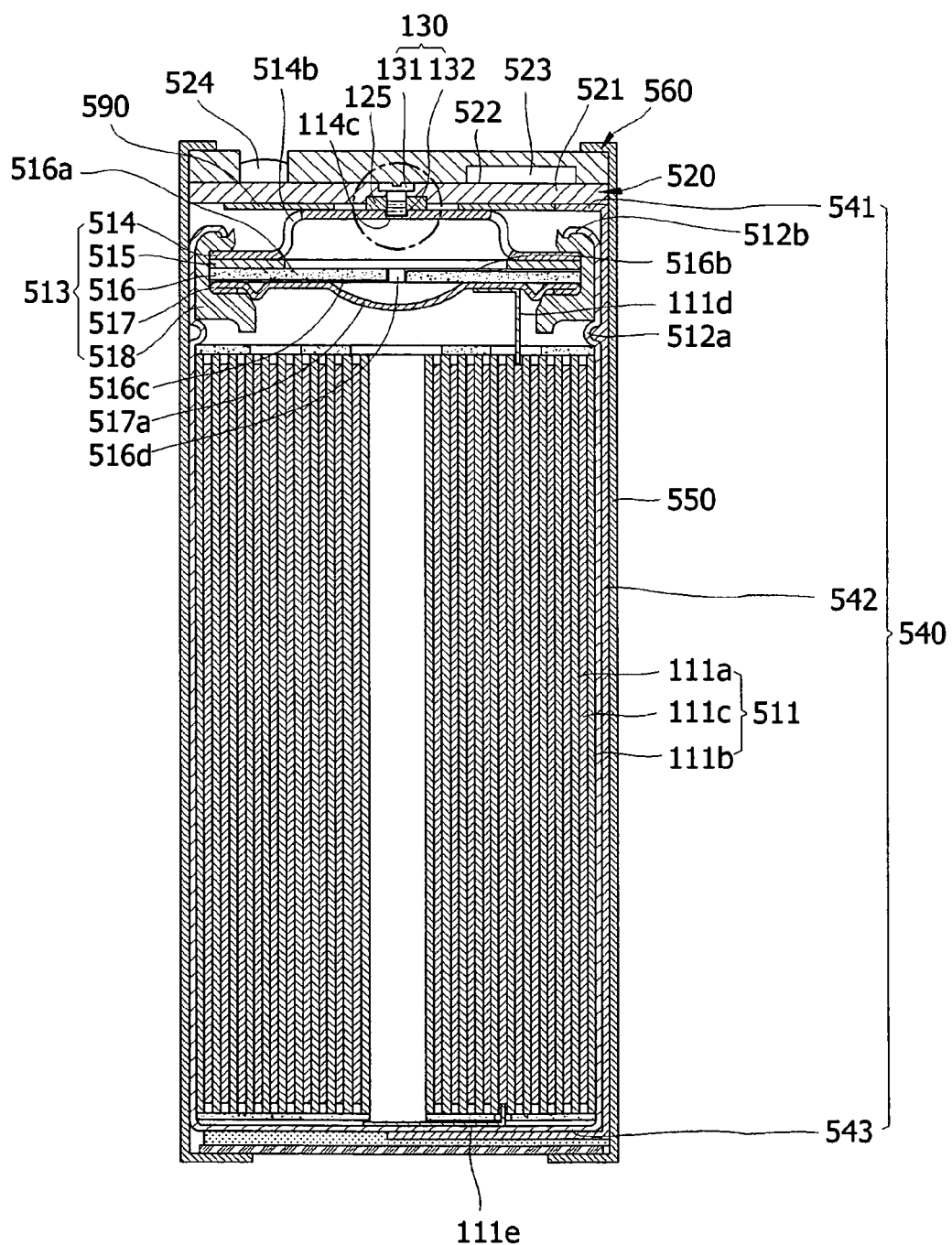
FIG. 5e illustrates a sectional view taken along 'V-V' line of FIG. 5c.
Figure 5F:
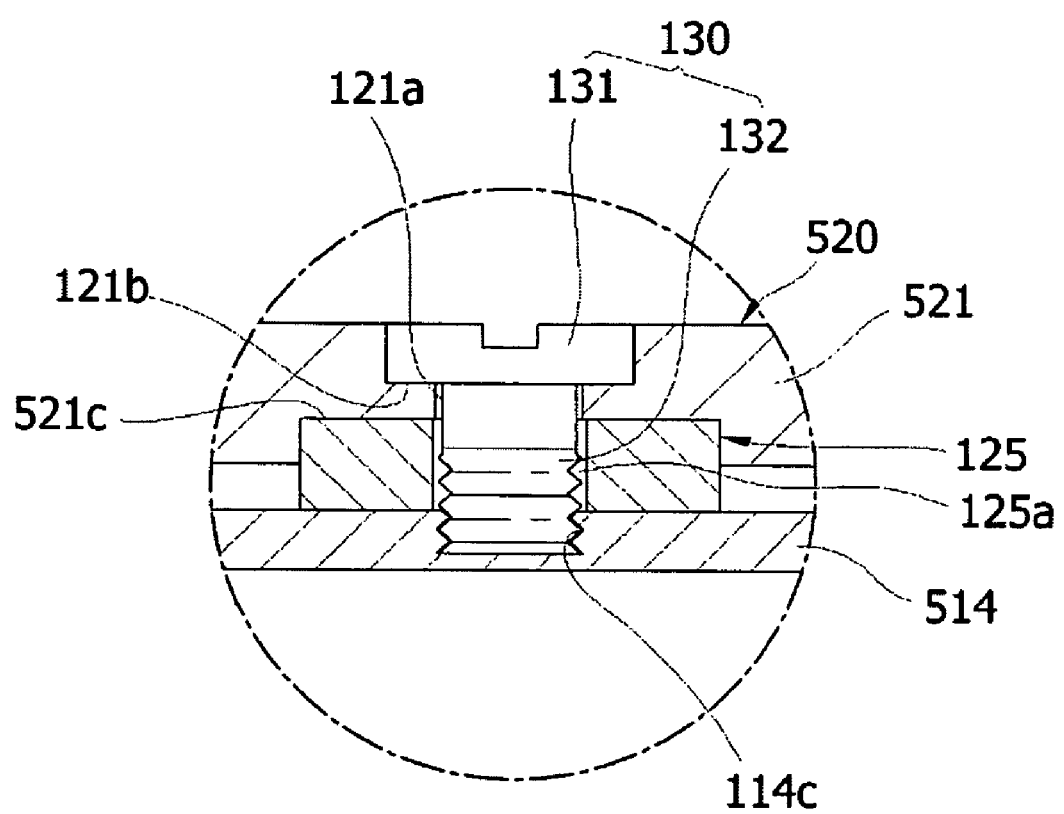
FIG. 5f illustrates a magnified partial sectional view of a peripheral region of an electrode terminal shown in FIG. 5e.
Figure 6A:
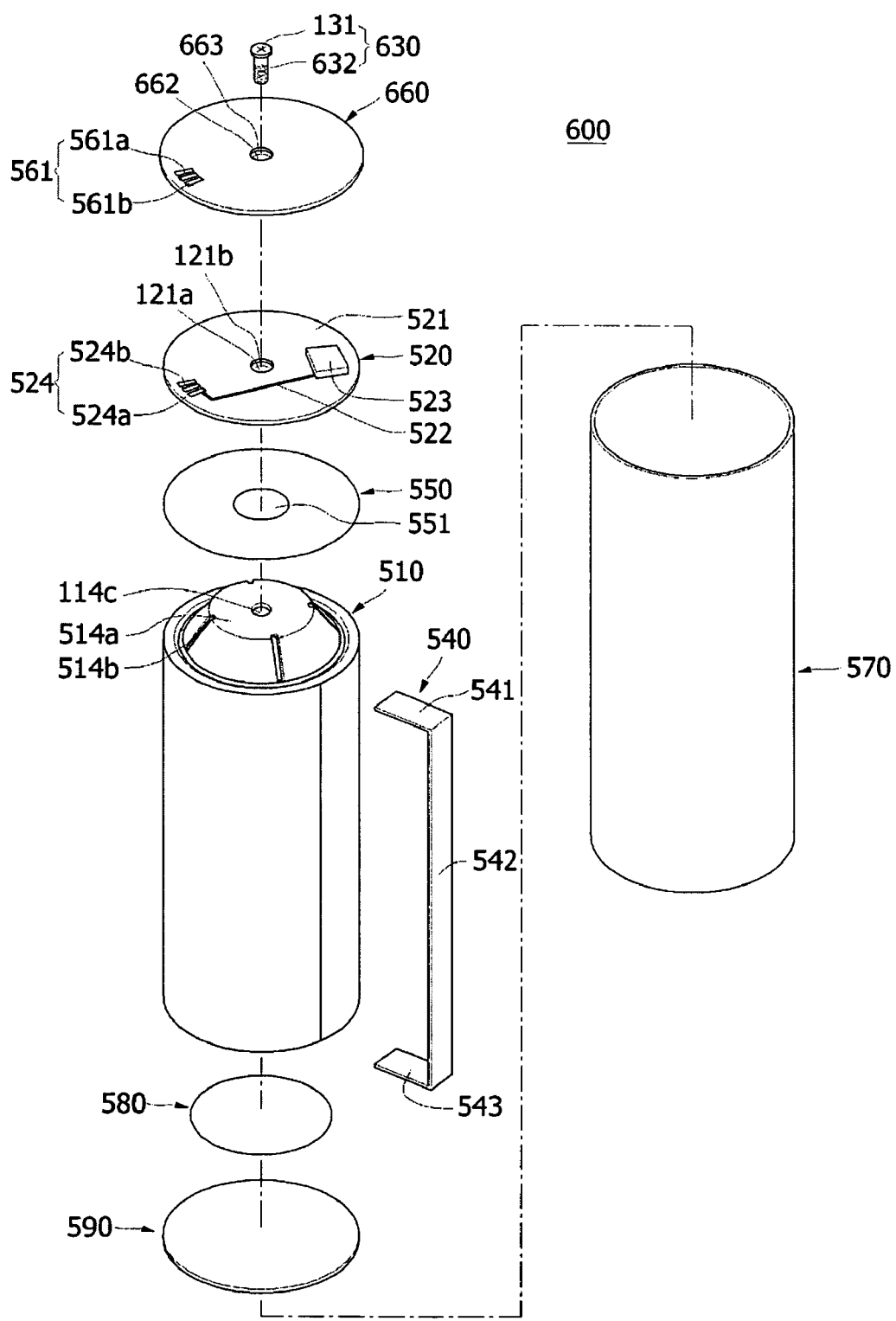
FIG. 6a illustrates an exploded perspective view of a battery pack according an embodiment.
Figure 6B:
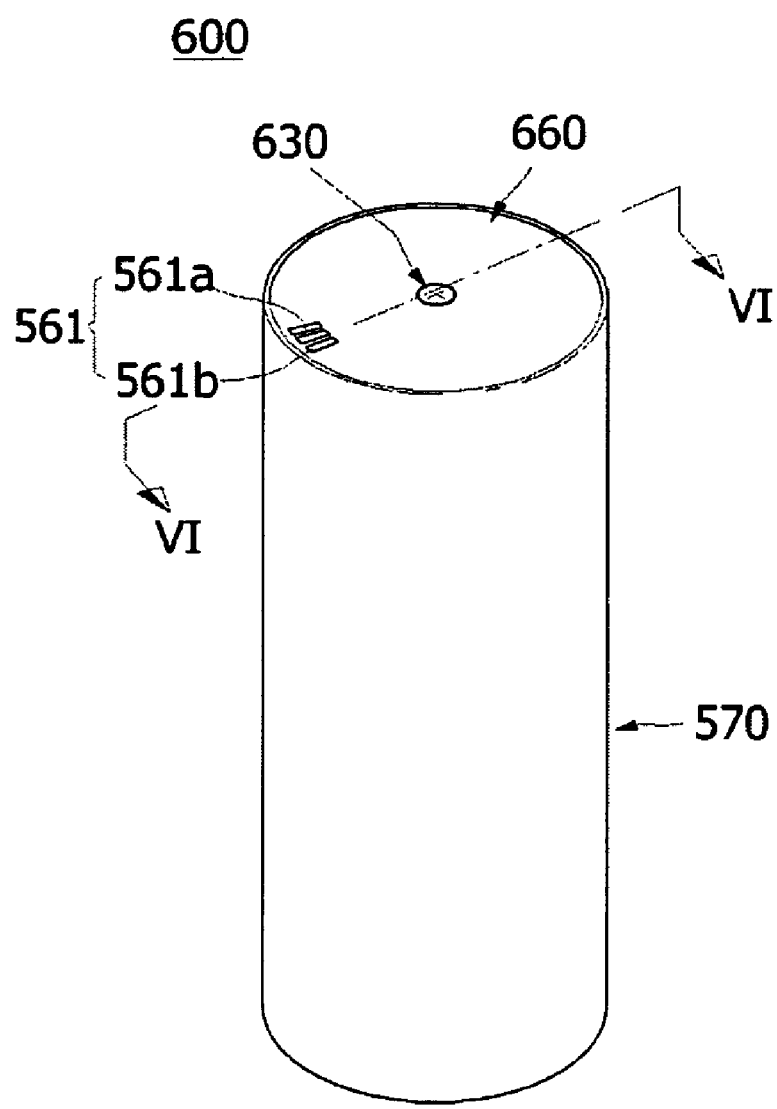
Figure 6C:
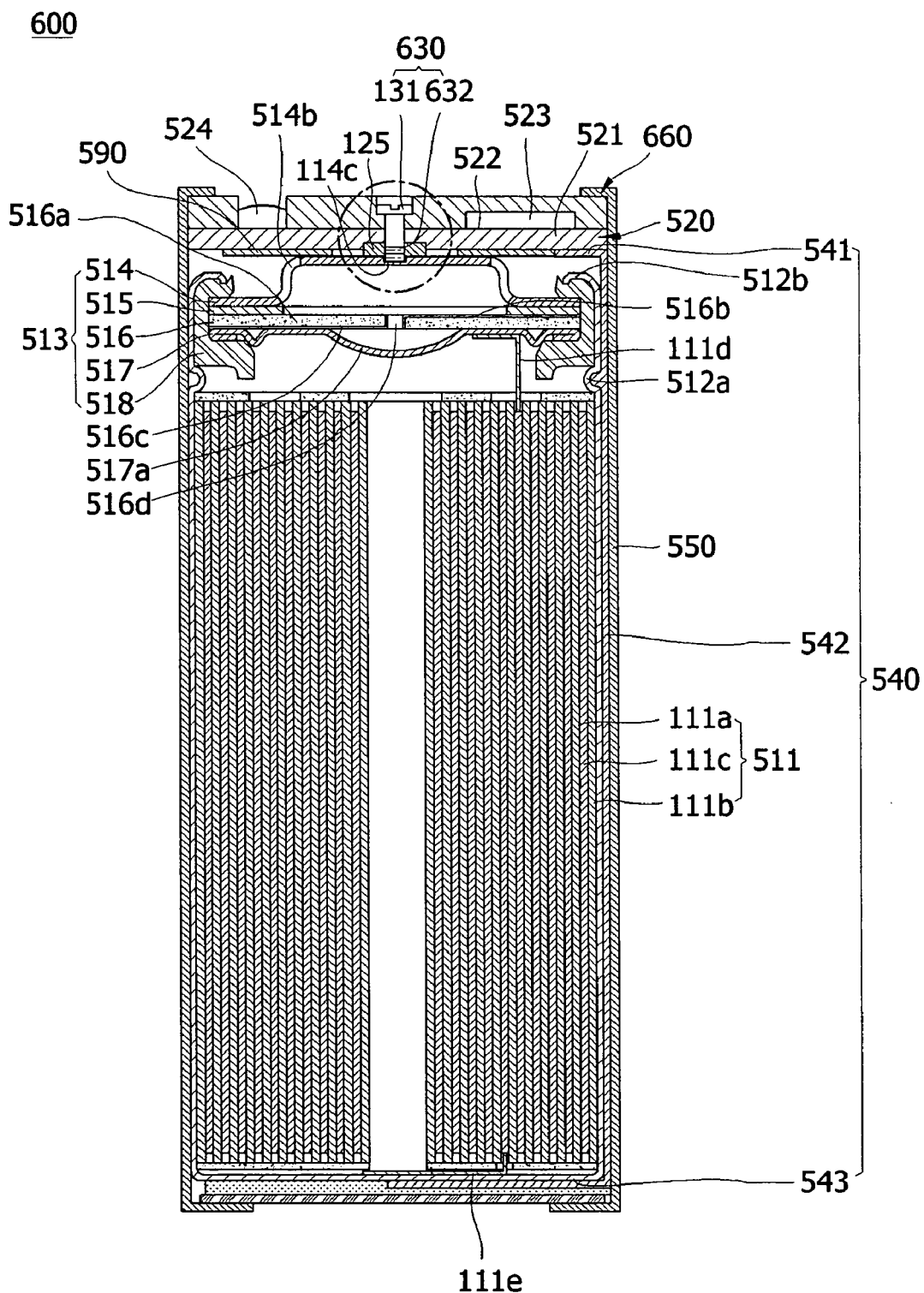
FIG. 6c illustrates a sectional view taken along 'VI-VI' line of FIG. 6b.
Figure 6D:
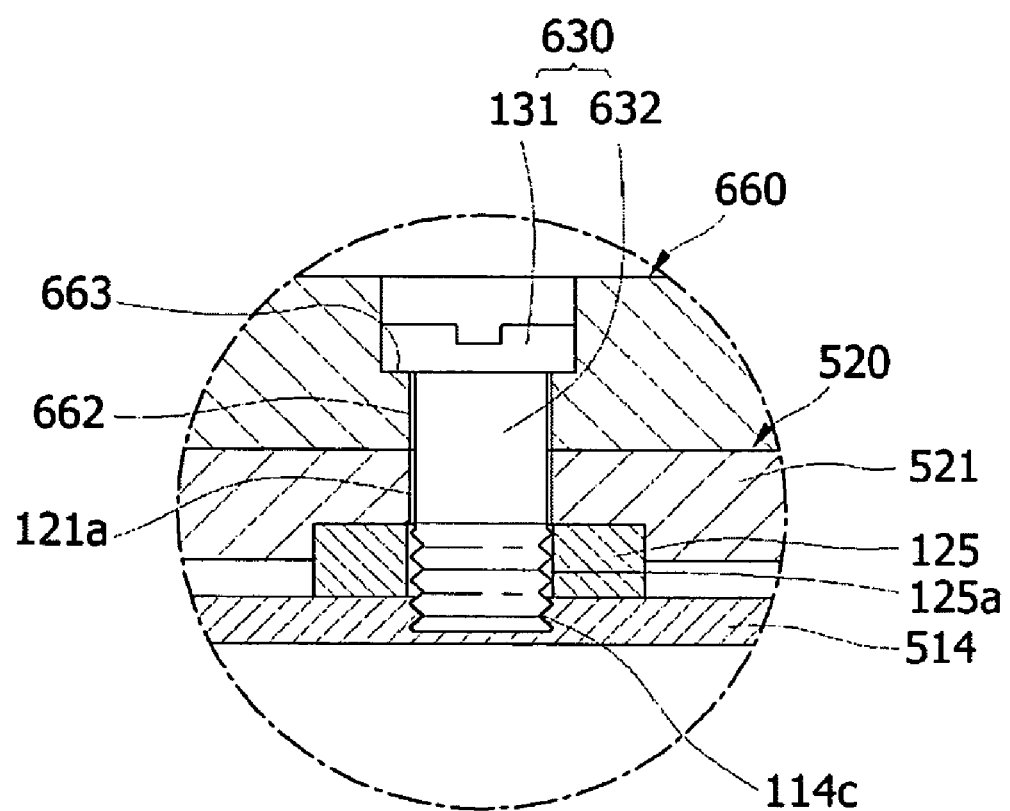
FIG. 6d illustrates a magnified partial sectional view of a peripheral region of an electrode terminal shown in FIG. 6c.

Referring to FIGS. 3a to 3c, the battery pack 300 may include a cell 110, a circuit board 220 and a bolt 130. In addition, the battery pack 300 may further include a conducting member 340, an insulator 150, a cover 160, an outer case 170, and/or a conducting member bolt 380. In the embodiment, the cell 110, circuit board 220, bolt 130, cover 160, and outer case 170 may be the same or similar to the elements as described above, and explanation about them will be omitted. In addition, explanation about the same or similar elements corresponding to those of the above described embodiment will be also omitted. In the embodiment, the conducting member 340 and the conducting member bolt 380 will be mainly explained. In addition, two pairs of the conducting members 340 and conducting member bolts 380 are shown in the drawing, but one pair may effectively be used.

The conducting member 340 may include a first region 341, a second region 342, and a third region 343. The first region 341 may be soldered, and electrically coupled, to the circuit board 220. The first region 341 may be electrically coupled to a cathode terminal 124b of a charging/discharging terminal 124 on the circuit board 220.

The second region 342 may be connected to the first region 341, and bent with respect to the first region 341. It may be desirable that the second region 342 be bent perpendicularly to the first region 341, to beneficially reduce assembling error between the circuit board 220 and cell 110.

The third region 343 may be connected to the second region 342, and bent with respect to the second region 342. The third region 343 may be bent away from the first region 341. It may be desirable that the third region 343 be bent substantially perpendicularly to the second region 342 to desirably reduce assembling error between the circuit board 220 and cell 110.

The third region 343 may include a bolt through-hole 344, corresponding to a side part coupling groove 115g in the cap plate 115. The conducting member bolt 380 may include a head 381 and a body 382. A bolt coupling groove 381a may be formed on an upper surface of the head 381. In addition, a lower surface of the head 381 may contact an upper surface of the third region 343.

The body 382 may be connected to the head 381, and may include threads. The body 382 may pass through the conducting member bolt through-hole 344. In addition, the threads of the body 382 may couple to the coupling groove 115g.

In the battery pack 300, the conducting member 340 may be connected to the cell 110 by the conducting member bolt 380. The conducting member 340 may electrically couple the circuit board 220 to the cathode of the cell 110. In addition, the conducting member bolt 380 may fix and press the conducting member 340 to the cell 110, thereby easing assembly and improving efficiency of the battery pack 300. More particularly, in the battery pack 300, the circuit board 220 may be easily connected to the cell 110 by fastening the bolt 130 and the conducting member bolt 380. The cell 110 and circuit board 220 may be electrically coupled without additional welding processes. Thus, assembly of the battery pack 300 may be simplified to improve efficiency.

Referring to FIGS. 4a to 4d, the battery pack 400 may include a cell 110, a circuit board 220, and a bolt 430. In addition, the battery pack 400 may further include a conducting member 340, an insulator 150, a cover 460, an outer case 170, and/or a conducting member bolt 380. In the embodiment, the cell 110, circuit board 220, conducting member 340, and outer case 170 may be the same or similar to the elements as described above, explanation about them will be omitted. In addition, explanation about the same or similar elements corresponding to those of the above described embodiment will be also omitted. In the embodiment, the bolt 430 and cover 460 will be mainly explained.

The bolt 430 may include a bolt head 131 and bolt body 432. A length of the bolt body 432 may be longer than that of the bolt body of the bolts described above. Other shapes are similar to the above bolt. Accordingly, detailed explanation about the bolt 430 will be omitted.

The cover 460 may have a shape similar to the above described cover, except that a cover hole 462 may be formed in the middle thereof. In addition, a cover groove 463 having a diameter larger than that of the cover hole 462 may be formed at an upper part of the cover hole 462. The depth of the cover groove 463 may be greater than the thickness of the bolt head 131.

The bolt body 432 of the bolt 430 may pass through the cover hole 462, a bolt through-hole 121a in the circuit board 220, and a conducting pad hole 125a in the conducting pad 125. The bolt body 432 may be coupled to a bolt coupling region 114c, which may be formed as a groove or hole in an electrode terminal 114. In addition, the bolt head 131 may be inserted into the cover groove 463. The bolt head 131 may have a diameter larger than the cover hole 462, and may contact the cover case groove 463.

In the embodiment, ease of assembly of the battery pack 400 may be improved because the cell 110, circuit board 220, and cover 460 may be integrated by the bolt 430. In addition, the bolt 430 may strongly couple the conducting pad 125 to the electrode terminal 114, thereby beneficially improving conductivity between the cell 110 and circuit board 220.

Referring to FIGS. 5a to 5f, the battery pack 500 may include a cell 510, a circuit board 520, and a bolt 130. In addition, the battery pack 500 may further include a conducting member 540, an insulator 550, a cover 560, and/or an outer case 570. In addition, the battery pack 500 may further include a lower tape 580 and a lower case 590.

The cell 510 may be a rechargeable battery having a cathode and an anode. The cell 510 may be a cylindrical cell 510, different from the above described rectangular cell. In the embodiment, the cell 510 may include an electrode assembly 511, a can 512, and a cap assembly 513.

The electrode assembly 511 may include a cathode plate 111a, an anode plate 111b, a separator 111c, a cathode tab 111d, and an anode tab 111e. Here, the separator 111c may be interposed between the cathode plate 111a and anode plate 111b. The cathode plate 111a, separator 111c, and anode plate 111b may be wound in a jelly-roll shape to form the electrode assembly 511. The cathode plate 111a, separator 111c, anode plate 111b, cathode tab 111d, and anode tab 111e have been explained in the above description, and thus explanation about them will be omitted. Differences in combining relationships will be mainly explained. In the embodiment, the electrode assembly 511 may be formed in a cylindrical shape. The cathode tab 111d may project out of the upper part of the electrode assembly 511, and the anode tab may project out of the lower part of the electrode assembly 511.

The can 512 may include an opening at one end and may receive the electrode assembly 511 through the opening. In the embodiment, the can 512 may have a cylindrical shape, and have a deeply concave beading part 512a on the circumference edge. In addition, a clamping part 512b may be formed by bending the opening of the can 512. In the embodiment, the can 512 may be formed of conductive metal, e.g., aluminum or aluminum-containing alloy. An inner lower surface of the can 512 may be electrically coupled to the anode tab.

The cap assembly 513 may include an electrode terminal 514, a positive temperature coefficient ("PTC") element 515, a safety vent 517, and an insulating gasket 518. In addition, the cap assembly 513 may further include a current interrupt element 516.

The electrode terminal 514 may have a circular plate shape with a projection 514a in the middle thereof. A gas discharging hole 514b may be formed around the projection 514a. The electrode terminal 514 may be formed of conductive metal, e.g., stainless steel. The electrode terminal 514 may act as a cathode because it may be electrically coupled to the cathode plate 111a of the electrode assembly 511.

The PTC element 515 may be under the electrode terminal 514 and electrically coupled to the electrode terminal 514. In addition, the PTC element 515 may be electrically coupled to an upper printed circuit pattern 516b of the current interrupt element 516. The PTC element 515 may interrupt current between the electrode terminal 514 and current interrupt element 516 by reacting to a predetermined temperature when the electrode assembly 511 overheats.

The current interrupt element 516 may include an insulating substrate 516a, an upper printed circuit pattern 516b on the insulating substrate 516a, and a lower printed circuit pattern 516c under the insulating substrate 516a. The upper printed circuit pattern 516b may be electrically coupled to the PTC element 515. The lower printed circuit pattern 516c may be electrically coupled to the safety vent 517. The current interrupt element 516 may further include a cross bar of a ring type for connecting a circular ring. A via hole 516d may be formed in the middle of the cross bar. The upper printed circuit pattern 516b and lower printed circuit pattern 516c may be electrically coupled to each other through the via hole 516d.

The safety vent 517 may be at a lower part of the current interrupt element 516 and may includes a central projection 517a projected downward from a middle part. The safety vent 517 may be electrically coupled to both the lower printed circuit pattern 516c of the current interrupt element 516 and the cathode tab 111d.

The current interrupt element 516 may secondarily interrupt current flowing between the PTC element 515 and safety vent 517 by deformation of the safety vent 517. More particularly, when internal pressure of the can 512 is increased over a predetermined threshold value due to, e.g., overheating of the electrode assembly 511, the central projection 517a of the safety vent 517 may project upward and be deformed. The central projection 517a may be broken by discharge gas generated in the can 512 and released through a gas discharging hole 514b. Here, the cross bar of the current interrupt element 516 may be broken by the central projection 517a of the safety vent 517. The lower printed circuit pattern 516c may then be electrically disconnected from the upper printed circuit pattern 516b. In other words, the current interrupt element 516 may secondarily interrupt current flow of the cell 510 when the safety vent 517 is broken. Similarly, the PTC element 515 may react to temperature to interrupt current flow of the cell 510. As described above, the current interrupt element 516 may be selectively used to prevent explosion of the cell 510.

The insulating gasket 518 may surround the electrode terminal 514, PTC element 515, current interrupt element 516, and the circumference surface of the side part of the safety vent 517. The insulating gasket 518 may insulate the electrode terminal 514, PTC element 515, current interrupt element 516, and a side part of the safety vent 517 from the can 512. The lower surface of the insulating gasket 518 may be supported by the beading part 512a of the can 512. In addition, the upper surface of the insulating gasket 518 may be pressed by a clamping part 512b at the opening of the can 512. Thus, the insulating gasket 518 may insulate the electrode terminal 514, PTC element 515, current interrupt element 516, and the side part of the safety vent 517. The insulating gasket 518 may simultaneously seal the opening of the can 512. The insulating gasket 518 may be made of polymer resin, e.g., polypropylene.

The circuit board 520 may include an insulating substrate 521, a printed circuit pattern 522, a protection circuit unit 523, and a charging/discharging terminal 524. In addition, the circuit board 520 may further include a conducting pad 125 as well as cathode and anode terminals 524a and 524b. The circuit board 520 may have a circular plate shape. Elements of the circuit board 520 are the same as or similar to the above described circuit boards, and thus explanation about them will be omitted.

The conducting member 540 may include a first region 541, a second region 542, and a third region 543. The first region 541 may be soldered to the circuit board 520. The second region 542 may be connected to the first region 541. In addition, the second region 542 may be bent with respect to the first region 541 and may pass by the side surface of the cell 510. The second region 542 may be bent substantially perpendicular to the first region 541. The second region 542 may be longer than a length of the side surface of the cell 510.

The third region 543 may be connected to the second region 542. In addition, the third region 543 may be bent with respect to the second region 542 and electrically coupled to the lower surface of the cell 510. The lower surface of the cell 510 may correspond to the can 512, and thus may form the anode. The third region 543 may be bent substantially perpendicular to the second region 542, and towards the first region 541. In addition, the third region 543 may be electrically coupled to the lower surface of the cell 510 by, e.g., resistance welding or laser welding.

The conducting member 540 may be formed of, e.g., nickel or nickel-containing alloy, to couple the circuit board 520 to the anode of the cell 510. The conducting member 540 may be electrically coupled to the protection circuit unit 523. In other words, the conducting member 540 may have anode polarity, different from the above described embodiment. In turn, the electrode terminal 514 may act as a cathode.

The insulator 550 may be interposed between the circuit board 520 and cell 510. The insulator 550 may have a circular shape, and may have an insulator hole 551. The conducting pad 125, and the bolt body 132 of the bolt 130, may pass through the insulator hole 551. In an embodiment, the insulator 550 may be formed of, e.g., a double-sided tape, to insulate the circuit board 520 from the electrode terminal 514.

The cover 560 may have a circular plate shape, and may surround the upper surface of the circuit board 520. The cover 560 may have a charging/discharging terminal hole 561, including a cathode terminal hole 561a and an anode terminal hole 561b. The cover 560 may be the same as the above described cover except for the shape thereof. Accordingly, explanation about it will be omitted.

The lower tape 580 may be attached to the lower surface of the bare cell 510. The third region 543 of the conducting member 540 may have already been attached to the lower surface of the cell 510, prior to attachment of the lower tape 580.

The lower case 590 may be attached to the lower surface of the lower tape 580, and surround the lower surface of the cell 510. The lower case 590 may be, e.g., an injection molded article, and may insulate the lower surface of the cell 510.

The outer case 570 may surround the cover 560 and cell 510. In addition, the outer case 570 may integrate the cover 560, cell 510, and outer case 570 by surrounding the lower case 590. In an embodiment, the outer case 570 may be a tube formed of, e.g., PET resin. The outer case 570 may surround the cover 560 and cell 510, thereby improving coupling strength between the cover 560 and cell 510.

In the battery pack battery pack 500, the circuit board 520 may be connected to the electrode terminal 514 by the bolt 130. Thus, the circular plate type circuit board 520 may be integrated with the cylindrical cell 110, and thus easing assembly of the battery pack 100.

In addition, the internal resistance between the electrode terminal 514 and circuit board 520 may be reduced because the coupling strength between the electrode terminal 514 and conducting pad 125 may be improved by the bolt 130. In other words, conductivity between the electrode terminal 514 and circuit board 520 may be improved. Accordingly, conductivity of the battery pack 500 may be improved. The internal resistance may be kept very low even if the battery pack 500 is used for a long time. Thus, degradation of the battery pack 500 may be beneficially retarded.

In addition, in the battery pack 500, the distance between the upper surface of the circuit board 520 and the lower surface of the cell 510 may be reduced because the conducting pad 125 may be inserted into the circuit board 520. In addition, the distance between the upper surface of the circuit board 520 and the lower surface of the cell 510 may be reduced because the bolt head 131 of the bolt 130 may also be inserted into the circuit board 520. Thus, installation performance of the battery pack 500 may be improved, and the volume occupied in the portable electronic device may be advantageously reduced.

Referring to FIGS. 6a to 6d, the battery pack 600 may include a cell 510, a circuit board 520 and a bolt 630. In addition, the battery pack 600 may further include a conducting member 540, an insulator 550, a cover 660, an outer case 570, a lower tape 580, and/or a lower case 590. In an embodiment, the cell 510, circuit board 520, bolt 630, conducting member 540, conducting member bolt 380, cover 660, outer case 570, lower tape 580, and lower case 590 may be the same or similar to the elements as described above, explanation about them will be omitted. In addition, explanation about the same or similar elements corresponding to those of the above described embodiment will be also omitted. In the embodiment, the bolt 630 and cover 660 will be mainly explained.

The bolt 630 may include a bolt head 131 and bolt body 632. The length of the bolt body 632 may be longer than that of the bolt body of the above described bolt. Other shapes thereof may be similar to the above bolt. Accordingly, detailed explanation about the bolt 630 will be omitted.

The cover 660 may have a shape similar to the above described cover except that it may include a cover hole 662. In addition, a cover groove 663 larger than a diameter of the cover hole 662 may be formed at an upper part of the cover hole 662. A depth of the cover groove 663 may be greater than a thickness of the bolt head 131. Accordingly, when the bolt head 131 is inserted into the cover groove 663, the entire bolt head 131 may be surrounded by the cover groove 663. A diameter of the bolt body 632 may be smaller than that of the bolt head 131. Thus, the bolt body 632 may pass through the cover hole 662 of the cover 660, a bolt through-hole 121a of the circuit board 520, and a conducting pad hole 125a of the conducting pad 125. The threads of bolt body 632 may be coupled to the bolt coupling groove 114c of the electrode terminal 514.

In an embodiment, ease of assembly of the battery pack 600 may be improved because the cell 510, circuit board 520, and cover 660 may be integrated by the bolt 630. In addition, the bolt 630 may strongly couple the conducting pad 125 to the electrode terminal 114, thereby improving conductivity between the cell 510 and circuit board 520.

As described above, the battery pack according to an embodiment may produce the following effects.

First, the battery pack may improve efficiency by simplifying the assembly process of the cell and circuit board.

Second, the conductivity between the cell and circuit board may be improved, preventing an increase of the internal resistance, even if the battery pack 100 is used for a lone time or external impact is applied.

Third, the battery pack may be slimmed, thereby reducing installation space thereof in portable electronic devices.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope as set forth in the following claims.

What is claimed is:
1. A battery pack, comprising:
a cell including a cathode, an anode, and an electrode terminal having a bolt coupling region on a surface thereof;
a circuit board electrically coupled to the cell, the circuit board having a conducting pad insertion groove at a lower part thereof and a bolt through-hole at a position corresponding to the bolt coupling region;
a conducting pad between the circuit board and electrode terminal, the conducting pad electrically coupling the circuit board to the electrode terminal; and
a bolt passing through the bolt through-hole coupled to the bolt coupling region, wherein
the conducting pad is connected to the electrode terminal and is in the conducting pad insertion groove.

2. The battery pack as claimed in claim 1, wherein the cell includes:
an electrode assembly;
a can having an opening at one end for the electrode assembly; and
a cap assembly including:
the electrode terminal,
a cap plate having an electrode terminal hole corresponding to the electrode terminal, and sealing the opening of the can,
an insulating gasket between the electrode terminal and the cap plate,
a terminal plate having a terminal plate hole corresponding to the electrode terminal, and
an insulating plate between the terminal plate and the cap plate.

3. The battery pack as claimed in claim 1, wherein the circuit board includes:
an insulating substrate,
a printed circuit pattern electrically coupled to the cell, and formed integrally with the insulating substrate,
a protection circuit unit on the insulating substrate, and electrically coupled to the printed circuit pattern, and
a charging/discharging terminal electrically coupled to the printed circuit pattern and protection circuit unit.

4. The battery pack as claimed in claim 1, wherein:
the electrode terminal is electrically coupled to the cathode or anode of the cell, and
the electrode terminal is electrically coupled to the circuit board by the bolt.

5. The battery pack as claimed in claim 1, wherein:
the bolt includes:
a bolt head having a screw driver coupling groove, and
a bolt body connected to the bolt head, the bolt body having a diameter smaller than that of the bolt head, and threads formed on an outer circumference surface thereof,
the circuit board includes a bolt head seating groove having a diameter larger than that of the bolt through-hole at an upper part of the bolt through-hole, and
the bolt head is seated in the bolt head seating groove.

6. The battery pack as claimed in claim 1, wherein:
the conducting pad includes a conducting pad hole, and
the bolt passes through the conducting pad hole and is coupled to the bolt coupling region.

7. The battery pack as claimed in claim 1, further comprising a conducting member electrically coupling the cell to the circuit board, wherein the conducting member is electrically coupled to the anode of the cell when a polarity of the electrode terminal is positive, and is electrically coupled to the cathode of the cell when a polarity of the electrode terminal is negative.

8. The battery pack as claimed in claim 7, wherein:
the conducting member includes:
a conducting member head having a screw driver coupling groove,
a conducting member body, connected to the conducting member head, having a diameter smaller than that of the conducting member head, and having threads on a portion thereof, and
a conducting member projection, spaced from the conducting member head, and projecting from a circumference surface of the conducting member body,
the cell includes a side part coupling groove on the surface of the cell including the electrode terminal, and the threads of the conducting member are coupled to the side part coupling groove,
the circuit board includes a conducting member insertion groove at a peripheral part of the circuit board, and
a lower part of the conducting member head is seated on an upper surface of the conducting member insertion groove, and an upper surface of the conducting member projection contacts a lower surface of the conducting member insertion groove.

9. The battery pack as claimed in claim 7, wherein the conducting member includes:
a first region electrically coupled to the circuit board,
a second region bent substantially perpendicularly to the first region, and
a third region electrically coupled to the cell, bent substantially perpendicularly to the second region, and bent away from the first region.

10. The battery pack as claimed in claim 7, wherein the conducting member is electrically coupled to the circuit board, and includes a laser welding part at a position where the conducting member contacts the cell.

11. The battery pack as claimed in claim 7, further comprising a conducting member bolt connecting the conducting member to the cell, wherein:
the conducting member includes a conducting member bolt through-hole on a surface thereof, and
the cell includes a side part coupling groove on the surface including the electrode terminal, the conducting member bolt passes through the conducting member bolt through-hole, and is coupled to the side part coupling groove.

12. The battery pack as claimed in claim 7, wherein the conducting member includes:
a first region electrically coupled to the circuit board,
a second region, bent substantially perpendicular to the first region, and extending along a side surface of the cell, and
a third region, bent substantially perpendicular to the second region, connected to a lower surface of the cell, and bent towards the first region.

13. The battery pack as claimed in claim 1, wherein the cell includes:
an electrode assembly,
a cylindrical can having an opening for the electrode assembly, and
a cap assembly including:
the electrode terminal,
a PTC element under the electrode terminal,
a safety vent under the PTC element, and
an insulating gasket insulating the electrode terminal, PTC element, and a side part of the safety vent, and sealing the opening of the can.

14. The battery pack as claimed in claim 1, further comprising an insulator between the circuit board and the cell.

15. The battery pack as claimed in claim 1, further comprising a cover surrounding the circuit board, wherein the cover includes a charging/discharging terminal hole on a surface thereof.

16. The battery pack as claimed in claim 15, wherein the cover includes a cover hole, the bolt passing through the cover hole and bolt through-hole, and coupled to the bolt coupling region.

17. The battery pack as claimed in claim 16, wherein:

the cover includes a cover groove having a diameter larger than that of the cover hole, and the bolt includes a bolt head and a bolt body connected to the bolt head, the bolt body having threads and a diameter smaller than that of the bolt head, and the lower surface of the bolt head is seated in the cover groove.

18. The battery pack as claimed in claim 15, further comprising an outer case surrounding the cover and the cell.

* * * * *